(12) United States Patent
Fujii et al.

(10) Patent No.: US 11,874,431 B2
(45) Date of Patent: Jan. 16, 2024

(54) DIFFUSER AND LIGHTING DEVICE

(71) Applicant: Mitsubishi Electric Corporation, Tokyo (JP)

(72) Inventors: Yusuke Fujii, Tokyo (JP); Satoru Okagaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 145 days.

(21) Appl. No.: 17/612,229

(22) PCT Filed: Feb. 4, 2020

(86) PCT No.: PCT/JP2020/004189
§ 371 (c)(1),
(2) Date: Nov. 18, 2021

(87) PCT Pub. No.: WO2020/240933
PCT Pub. Date: Dec. 3, 2020

(65) Prior Publication Data
US 2022/0244448 A1 Aug. 4, 2022

(30) Foreign Application Priority Data
May 27, 2019 (JP) .................................. 2019-098789

(51) Int. Cl.
*G02B 5/02* (2006.01)
*F21V 8/00* (2006.01)

(52) U.S. Cl.
CPC ............. *G02B 6/0041* (2013.01); *G02B 5/02* (2013.01)

(58) Field of Classification Search
CPC .................................. G02B 6/0041; G02B 5/02
See application file for complete search history.

(56) References Cited

U.S. PATENT DOCUMENTS 9,860,957 B1 * 1/2018 Peterson ................ H05B 47/11
2011/0222309 A1 9/2011 Shinohara
(Continued)

FOREIGN PATENT DOCUMENTS

CN 101400492 A * 4/2009 ........... C03C 17/008
CN 107270177 A 10/2017
(Continued)

OTHER PUBLICATIONS

International Search Report and Written Opinion dated Apr. 14, 2020, received for PCT Application PCT/JP2020/004189, Filed on Feb. 4, 2020, 13 pages including English Translation.
(Continued)

*Primary Examiner* — Fatima N Farokhrooz
(74) *Attorney, Agent, or Firm* — XSENSUS LLP

(57) ABSTRACT

A diffuser generates scattered light and satisfies $$MFP=1/(\pi \times A^2 \times Q_s \times N)=\alpha Z_d,$$

$$0.4 \leq \alpha \leq 5$$

where N denotes a number of nanoparticles included in a unit volume of a light guiding and diffusing portion, A denotes an average particle radius of the nanoparticles, $Q_s$ denotes a scattering efficiency determined by a combination of the nanoparticles and a medium of the light guiding and diffusing portion, MFP denotes a mean free path for light of a design wavelength set in a range of 450 nm to 650 nm, $Z_d$ denotes a length of the light guiding and diffusing portion in a light guiding direction of incident light, and α denotes a coefficient.

20 Claims, 14 Drawing Sheets

(56) References Cited

U.S. PATENT DOCUMENTS

| | | |
|---|---|---|
| 2012/0008338 A1 | 1/2012 | Ono et al. |
| 2014/0185282 A1* | 7/2014 | Hsu .................. B32B 17/10623 977/773 |
| 2017/0051893 A1 | 2/2017 | Di Trapani |
| 2018/0016477 A1 | 1/2018 | Inoue et al. |
| 2018/0017233 A1 | 1/2018 | Takeshita |
| 2018/0066826 A1 | 3/2018 | Di Trapani et al. |
| 2018/0246270 A1 | 8/2018 | Di Trapani et al. |
| 2018/0345630 A1 | 12/2018 | Di Trapani et al. |

FOREIGN PATENT DOCUMENTS

| | | | |
|---|---|---|---|
| JP | 2008-130279 A | | 6/2008 |
| JP | 2010-123309 A | | 6/2010 |
| JP | 2011-187300 A | | 9/2011 |
| JP | 2012-14933 A | | 1/2012 |
| JP | 2012014933 A | * | 1/2012 |
| JP | 2012-79474 A | | 4/2012 |
| JP | 2015-207554 A | | 11/2015 |
| JP | 2017-152397 A | | 8/2017 |
| JP | 2018-10755 A | | 1/2018 |
| JP | 2018-530134 A | | 10/2018 |
| JP | 2019-503034 A | | 1/2019 |
| WO | 2010/113422 A1 | | 10/2010 |
| WO | WO-2014107425 A1 | * | 7/2014 ....... B32B 17/10036 |
| WO | 2016/129486 A1 | | 8/2016 |
| WO | 2019/063750 A1 | | 4/2019 |

OTHER PUBLICATIONS

Japanese Office Action dated Sep. 27, 2022, in corresponding Japanese Patent Application No. 2021-522629, 12 pp.

Extended European search report dated Jul. 15, 2022, in corresponding European patent Application No. 20814757.9, 7 pages.

\* cited by examiner

DIFFUSER AND LIGHTING DEVICE

CROSS-REFERENCE TO RELATED APPLICATIONS

The present application is based on PCT filing PCT/JP2020/004189, filed Feb. 4, 2020, which claims priority to JP 2019-098789, filed May 27, 2019, the entire contents of each are incorporated herein by reference.

TECHNICAL FIELD

The present disclosure relates to a diffuser and a lighting device.

BACKGROUND ART

A lighting system that simulates a blue sky is proposed, for example, in Patent Literature 1. In this lighting system, a light source is disposed on the upper side (e.g., a back surface side) of a diffused light generator (also referred to as a "diffuser") that is formed by dispersing nanoparticles for generating diffused light (e.g., Rayleigh scattered light) in a base material, and thus the lighting system has a large thickness. To reduce the thickness, it is preferable to employ an edge incidence system (also referred to as an "edge light system") in which a light source is disposed to face a side surface that is an edge portion of a plate-shaped diffuser.

CITATION LIST

Patent Literature

Patent Literature 1: Japanese Patent Application Publication No. 2015-207554

SUMMARY OF INVENTION

Technical Problem

However, in a lighting device with the edge incidence system, since incident light entering the diffuser is guided over a long distance, scattered light emitted through a light emission surface (e.g., a lower surface) of the diffuser is strongly affected by the concentration of the nanoparticles included in the diffuser.

For example, when the concentration of the nanoparticles included in the diffuser is too high, the effect of wavelength dispersion due to Rayleigh scattering is large, and a large part of the blue light component is extracted through the light emission surface in a short-distance area near the side surface on which the incident light is incident. Thus, no blue light component can be extracted in an area far from the side surface on which the incident light is incident, and color unevenness or brightness unevenness occurs in the light emission surface of the diffuser. On the other hand, when the concentration of the nanoparticles included in the diffuser is too low, the amount of illumination light extracted through the light emission surface of the diffuser is small, and thus the amount of illumination light is insufficient.

As above, a lighting device with the edge incidence system has a problem in that it cannot reproduce a natural blue sky in each of the case where the concentration of the nanoparticles included in the diffuser is too high and the case where the concentration is too low.

The present disclosure has been made to solve the above problem, and is intended to provide a diffuser and a lighting device that are capable of reproducing a natural blue sky.

Solution to Problem

A diffuser according to the present disclosure includes: at least one light incident surface on which light emitted from a light source is incident as incident light; a light guiding and diffusing portion including a medium and nanoparticles present in the medium, the light guiding and diffusing portion generating scattered light by guiding the incident light and scattering the incident light with the nanoparticles; and a light emission surface to emit the scattered light, wherein a correlated color temperature of the scattered light is higher than a correlated color temperature of the incident light, and the diffuser satisfies $$MFP = 1/(\pi \times A^2 \times Q_s \times N) = \alpha Z_d,$$

$$0.4 \leq \alpha \leq 5$$

where N denotes a number (particles/mm$^3$) of the nanoparticles included in a unit volume of the light guiding and diffusing portion, A denotes an average particle radius (mm) of the nanoparticles, $Q_s$ denotes a scattering efficiency determined by a combination of the nanoparticles and the medium of the light guiding and diffusing portion, n denotes a ratio of a circumference of a circle, MFP denotes a mean free path (mm) for light of a wavelength of 550 nm, $Z_d$ denotes a length (mm) of the light guiding and diffusing portion in a light guiding direction of the incident light, and a denotes a coefficient.

A lighting device according to the present disclosure includes a light source and the above diffuser.

Advantageous Effects of Invention

According to the present disclosure, it is possible to reproduce a natural blue sky.

DESCRIPTION OF EMBODIMENTS

Figure 1:
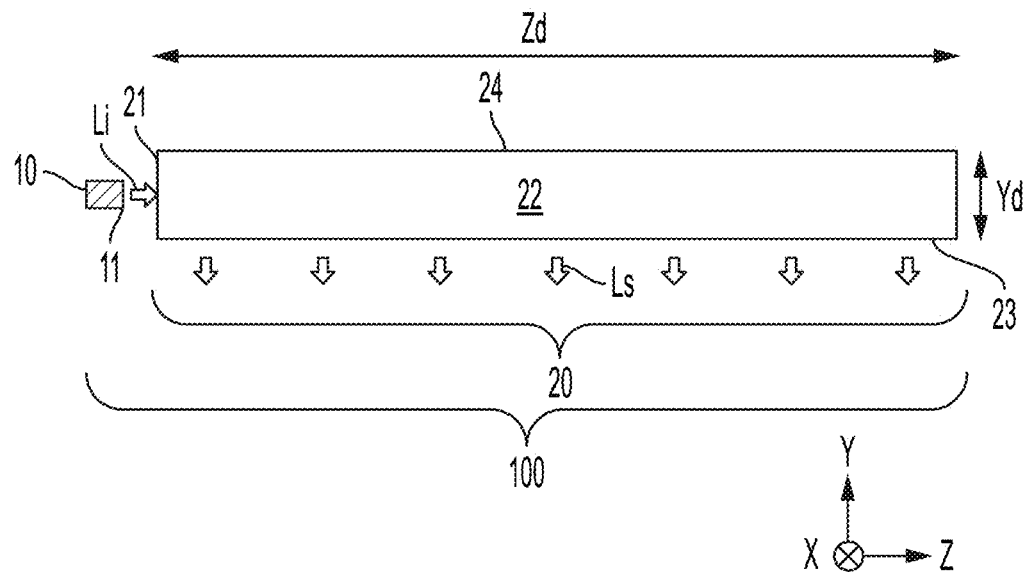
FIG. 1 is a cross-sectional view schematically illustrating a configuration of a lighting device according to a first embodiment.

In the following embodiments, diffusers and lighting devices including diffusers will be described with reference to the drawings. The lighting devices according to the embodiments can simulate the sky. The following embodiments are merely examples, and it is possible to combine embodiments as appropriate and to modify each embodiment as appropriate.

In each embodiment described below, to facilitate explanation, coordinate axes of an XYZ orthogonal coordinate system may be shown in drawings. In this case, a main emission direction that is a direction in which scattered light simulating the sky is mainly emitted from a diffuser is taken as the −Y axis direction. Also, of the directions perpendicular to the main emission direction, a direction closer to a traveling direction of light incident on the diffuser is taken as the Z axis direction.

Here, the main emission direction can be replaced with a normal direction of a main light emitting surface of the diffuser. The main light emitting surface refers to a particularly designated surface of one or more light emission surfaces of the diffuser. More specifically, the main light emitting surface should be one of the light emission surfaces of the diffuser that is particularly intended to be seen by a user as a light emitting surface that simulates the sky.

For example, when the diffuser has a plate shape, the main light emitting surface is one of two surfaces (referred to below as main surfaces) connected by side surface(s). Here, the plate shape is a shape having two main surfaces connected by side surface(s). Hereinafter, in the plate shape, one of the two main surfaces connected by the side surface(s) may be referred to as a first surface, and the other may be referred to as a second surface. Also, the side surface(s) of the plate shape may be referred to as edge surface(s) of the main surfaces.

Also, for example, when the diffuser has a rod shape, the main light emitting surface is one or part of side surface(s) of the column body. Here, the rod shape is a shape of a column body having two bases connected by side surface(s). Rod is a general term for column bodies. Also, for example, when it is installed as a window, the main light emitting surface is a surface whose normal direction is directed toward a room interior. Hereinafter, in the rod shape, regardless of whether it is a cylinder, a prism, or the like, the side surface(s) connected to the two bases (when it is hollow, the outer surface(s) of the side(s)) may be referred to as main surface(s), and the bases may be referred to as edge surfaces. Also, to distinguish between regions in the main surface(s), in the diffuser having a rod shape, when the main light emitting surface is formed in a partial region of the main surface(s) (the side surface(s) of the column body), the region may be referred to as a first surface, and a region of the main surface(s) opposite the region may be referred to as a second surface.

The main light emitting surface is not limited to a flat surface, and may, for example, include a curved surface or an inclined surface. The main light emitting surface may, for example, be curved or inclined, or may be a combination of a flat surface, a curved surface, or an inclined surface. When the main light emitting surface is not a flat surface, the normal direction of the main light emitting surface may be a normal direction of a central portion or a normal direction of a tangent plane. When the main light emitting surface forms the entire outer edge in a yz cross-section, such as when the side surface of a cylinder is taken as the main light emitting surface, the main emission direction may be taken as a normal direction at an arbitrary position of the main light emitting surface. In the following embodiments, the main emission direction is considered as one of emission directions of illumination light of the lighting device.

The sizes and scales of the illustrated elements vary between the drawings. Also, the coordinate axes of the XYZ orthogonal coordinate system are shown in drawings illustrating structures. When the lighting device is installed on a ceiling, the −Y direction is generally a vertically downward direction, and +Y direction is generally a vertically upward direction. The Z and X directions are directions perpendicular to the Y direction. Also, the Z and X directions are perpendicular to each other. When the lighting device is installed on a ceiling, the X and Z directions are generally horizontal.

<<1>> First Embodiment

<<1-1>> Outline of First Embodiment

Figure 2A:
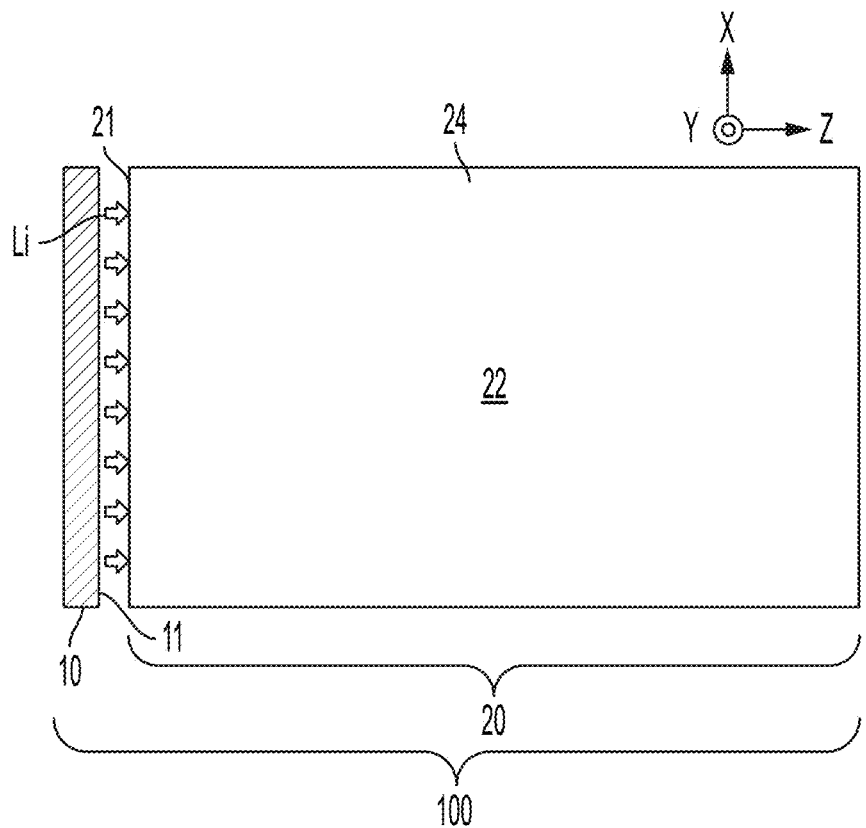
FIG. 2A is a plan view schematically illustrating the configuration of the lighting device according to the first embodiment.
Figure 2B:
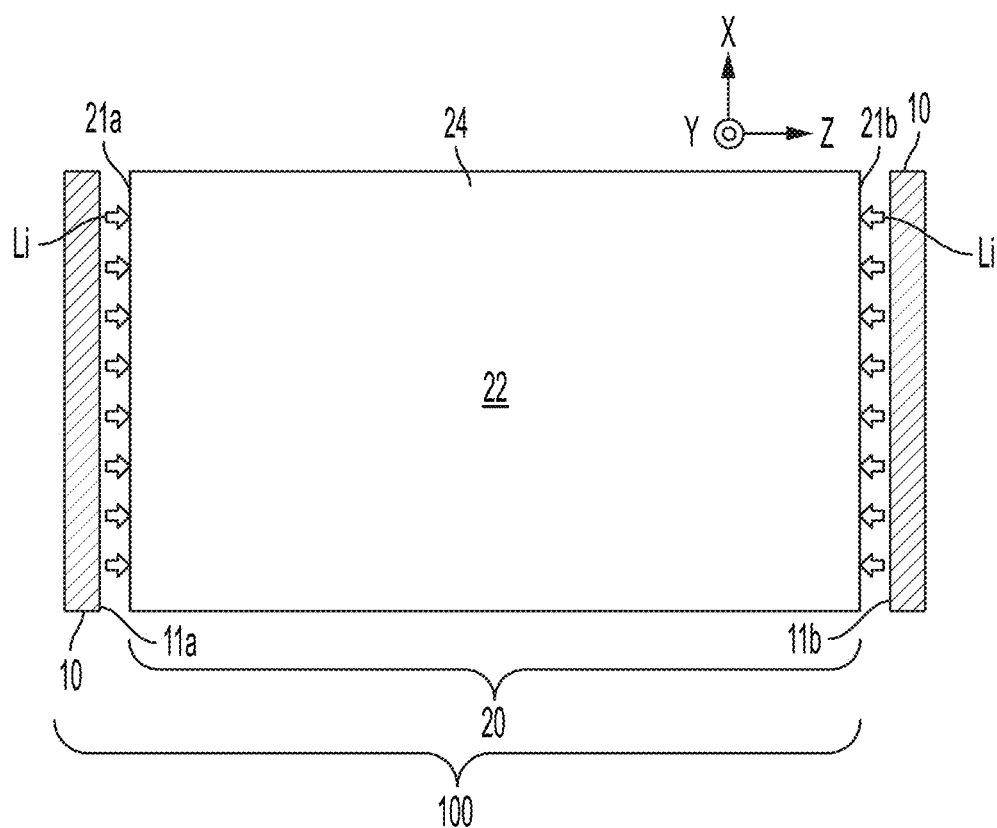
FIG. 2B is a plan view schematically illustrating a configuration of a lightin device according to a modification of the first embodiment.

FIG. 1 is a cross-sectional view schematically illustrating a configuration of a lighting device 100 according to a first embodiment. FIGS. 2A and 2B are plan views schematically illustrating configurations of the lighting device 100. As illustrated in FIGS. 1 2A, and 2B, the lighting device 100 includes at least one light source 10 and a diffuser 20. The lighting device TOO employs an edge incidence system in which the light source 10 is disposed to face at least one light incident surface 21 that is at least one side surface located at at least one edge portion of the diffuser 20. The diffuser 20 includes the: light incident surface 21, a light guiding and diffusing portion 22, and one or more light emission surfaces (in this example, a front surface 23 and a back surface 24). In this example, the front surface 23 is the main light emitting surface.

Light emitted from the light source 10 is incident on the light incident surface 21 as incident light Li. The light guiding and diffusing portion 22 includes a base material (e.g., a base material 27 illustrated in FIG. 5 to be described later) as a medium, and multiple nanoparticles (e.g., nanoparticles 26 illustrated in FIG. 5 to be described later) present in the base material. The light guiding and diffusing portion 22 generates scattered light Ls by guiding light Lt that is the incident light Li and scattering it with the nanoparticles.

The scattered light Ls includes Rayleigh scattered light. The scattered light Ls exits through the light emission surfaces. Here, the scattered light Ls refers to scattered light emitted through the front surface 23, which is the main light emitting surface, and scattered light emitted through the back surface 24 without particularly distinguishing between them. However, in cases such as when a light absorber is provided at the back surface, the scattered light Ls can be limited to scattered light emitted through the front surface 23.

As already described, when the concentration of the nanoparticles included in the light guiding and diffusing portion 22 is too high, the effect of wavelength dispersion due to Rayleigh scattering is large, and a large part of the blue component light is extracted as scattered light Ls through the light emission surfaces in a short-distance area near the light incident surface 21. Thus, no blue component light can be extracted in an area far from the light incident surface 21, and color unevenness or brightness unevenness occurs in the light emission surfaces of the light guiding and diffusing portion 22. On the other hand, when the concentration of the nanoparticles included in the light guiding and diffusing portion 22 is too low, the amount of illumination light extracted through the light emission surfaces of the light guiding and diffusing portion 22 is small, and the amount of illumination light is insufficient.

Thus, with respect to a preferred concentration of the nanoparticles in the light guiding and diffusing portion 22 of the diffuser 20, the present application proposes a novel condition in which a mean free path MFP of the incident light Li and a length $Z_d$ of the light guiding and diffusing portion 22 in a light guiding direction (+Z direction) of the incident light Li are associated with each other.

Specifically, the diffuser 20 is formed to satisfy $$MFP=1/(\pi \times A^2 \times Q_s \times N)=\alpha Z_d,$$

$$0.4 \le \alpha \le 5$$

where N denotes the number (i.e., concentration) (particles/mm³) of the nanoparticles included in a unit volume of the light guiding and diffusing portion 22, A denotes an average particle radius (mm) of the nanoparticles, $Q_s$ denotes a scattering efficiency determined by a combination of the nanoparticles and the medium of the light guiding and diffusing portion 22, n denotes the ratio of the circumference of a circle, MFP denotes a mean free path (mm) for light of a wavelength of 550 nm, $Z_d$ denotes a length (mm) of the light guiding and diffusing portion 22 in the light guiding direction of the incident light Li (i.e., the guided light Lt), and a denotes a coefficient. By forming the diffuser 20 in this manner, it is possible to reproduce a natural blue sky with less color unevenness and brightness unevenness over the entire region of the light emission surfaces of the diffuser 20 in the light guiding direction.

<<1-2>> Configuration of First Embodiment
<<Light Source 10>>

Figure 3:
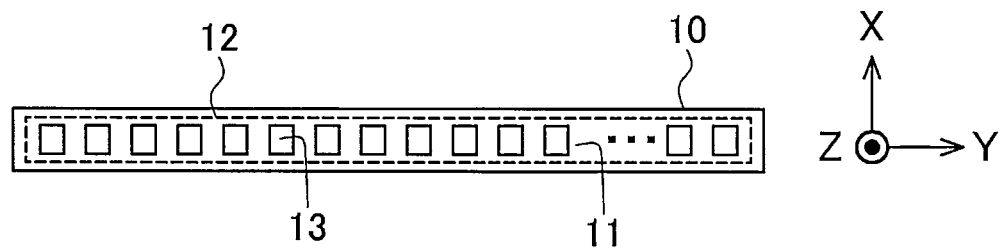
FIG. 3 is a front view schematically illustrating a configuration of a light source of the lighting device according to the first embodiment.

FIG. 3 is a front view schematically illustrating a configuration of the light source 10 of the lighting device 100. The light source 10 emits light having a correlated color temperature $T_{ci}$. The correlated color temperature $T_{ci}$ is, for example, 6500 K. The correlated color temperature $T_{ci}$ may be 5000 K. "Correlated color temperature" refers to the color temperature of a black-body radiation that appears to have a color closest to the color of the illuminant. The light source 10 may be, for example, a light source that emits white light as the light having the correlated color temperature $T_{ci}$.

The light source 10 is, for example, a light source including one or more light emitting diodes (LEDs) that are one or more light emitting elements. As illustrated in FIG. 3, the light source 10 includes a substrate 12 and one or more light emitting elements 13 that are one or more LED elements disposed on the substrate 12. In the example of FIG. 3, the light source 10 includes multiple light emitting elements 13 arranged in an array. The multiple light emitting elements 13 are configured to emit light having the same correlated color temperature $T_{ci}$.

The multiple light emitting elements 13 may include multiple types of LED elements that emit light having different correlated color temperatures $T_{ci}$. For example, light emitted by the multiple light emitting elements 13 may include light of three colors consisting of red light, green light, and blue light. In this case, the light source 10 includes an LED element that emits red light, an LED element that emits green light, and an LED element that emits blue light.

Also, light emitted by the multiple light emitting elements 13 may include light of three colors consisting of white light, green light, and blue light. In this case, the light source 10 includes an LED element that emits white light, an LED element that emits green light, and an LED element that emits blue light.

Also, light emitted by the multiple light emitting elements 13 may include light of four colors consisting of white light, green light, blue light, and orange light. In this case, the light source 10 includes an LED element that emits white light, an LED element that emits green light, an LED element that emits blue light, and an LED element that emits orange light.

The LED elements are an example of the light emitting elements 13. Each of the multiple light emitting elements may be one for which one or more of on/off control, light emission amount control, and light emission color control can be independently performed. With such controls, it is possible to represent not only a blue sky but also an evening or after-dark sky.

The light source 10 may be configured to emit white light by independently performing on/off control, light emission amount control, and light emission color control on each of the multiple light emitting elements 13. However, the color of light emitted from the light source 10 may be a color other than white. For example, by a control circuit independently controlling each of the multiple light emitting elements 13, it is possible to control the spectrum of the white light or emit light of a color other than white.

The combination of the light emission colors of the light emitting elements 13 included in the light source 10 is not limited to those described above. For example, the light source 10 may include one or more light emitting elements 13 that emit one or more of white light, green light, and orange light. Alternatively, the light source 10 may include one or more light emitting elements 13 that emit one or more of white light, green light, orange light, and blue light.

Also, the light source 10 may include a light emitting element 13 that emits white light having a low color temperature and a light emitting element 13 that emits white light having a high color temperature. Here, the difference in color temperature between the white light having the high color temperature and the white light having the low color temperature is, for example, not less than 2500 K. The difference in color temperature between the white light having the high color temperature and the white light having the low color temperature may be not less than 4000 K. Also, the difference in color temperature between the white light having the high color temperature and the white light having the low color temperature may be 8500 K. The correlated color temperature $T_{cwh}$ of the white light having the high color temperature is, for example, 11000 K. The correlated color temperature $T_{cwh}$ of the white light having the high color temperature is, for example, not lower than 6500 K. The correlated color temperature $T_{cwl}$ of the white light having the low color temperature is, for example, 4000 K. The correlated color temperature of the white light having the low color temperature is, for example, not lower than 2000 K. However, when the color temperature of the incident light Li incident on the light incident surface 21 or light emitted by each light emitting element 13 is far off the black body locus on a chromaticity diagram (e.g., a CIE 1931 chromaticity diagram) and it is difficult to represent it in correlated color temperature, the light color temperatures are not limited to the above values.

The light source 10 is disposed so that a light emitting surface 11 of the light source 10 faces an edge portion of the diffuser 20. The edge portion of the diffuser 20 is an edge portion of the light guiding and diffusing portion 22. When the light guiding and diffusing portion 22 has a plate shape, the light incident surface 21, which is an edge portion of the light guiding and diffusing portion 22, is a side surface across the light guiding direction, and is a side surface across the light emission surfaces (in this example, the front surface 23 and back surface 24). Also, when the light guiding and diffusing portion 22 has a rod shape, the edge portion of the light guiding and diffusing portion 22 is a side surface corresponding to a base of the rod shape.

As illustrated in FIGS. 1 2A, and 2B, the light emitting surface 11 of the light source 10 is disposed to face the light incident surface 21, which is a side surface of the diffuser 20. Also, the light source 10 is disposed along the light incident surface 21 of the diffuser 20, for example. Also, multiple light sources 10 may be disposed along the light incident surface 21 of the diffuser 20. Also, multiple rows of light sources 10 may be arranged in a thickness direction of the diffuser 20 along the light incident surface 21 of the diffuser 20. The lighting device 100 may include a first light source portion that faces a first light incident surface that is the light incident surface 21 of the diffuser 20, and a second light source portion that faces a second light incident surface that is a side surface opposite the light incident surface 21. Moreover, the lighting device 100 may include other light source portions that face two respective side surfaces adjacent to the light incident surface 21 of the diffuser 20.

Also, in view of zero energy building (ZEB), the light source 10 may be a device that guides external light (e.g., sunlight) or the like to the light incident surface of the diffuser 20. In guiding external light, an optical fiber, a light guide, or the like can be used. In this case, an end surface of the optical fiber that emits light is the light emitting surface 11. "ZEB" refers to a building whose annual consumption of primary energy is zero or very close to zero. Primary energy refers to energy sources, such as fossil fuels, that are directly obtained from nature. However, solar light is excluded from primary energy.

<<Diffuser 20>>

Figure 4:
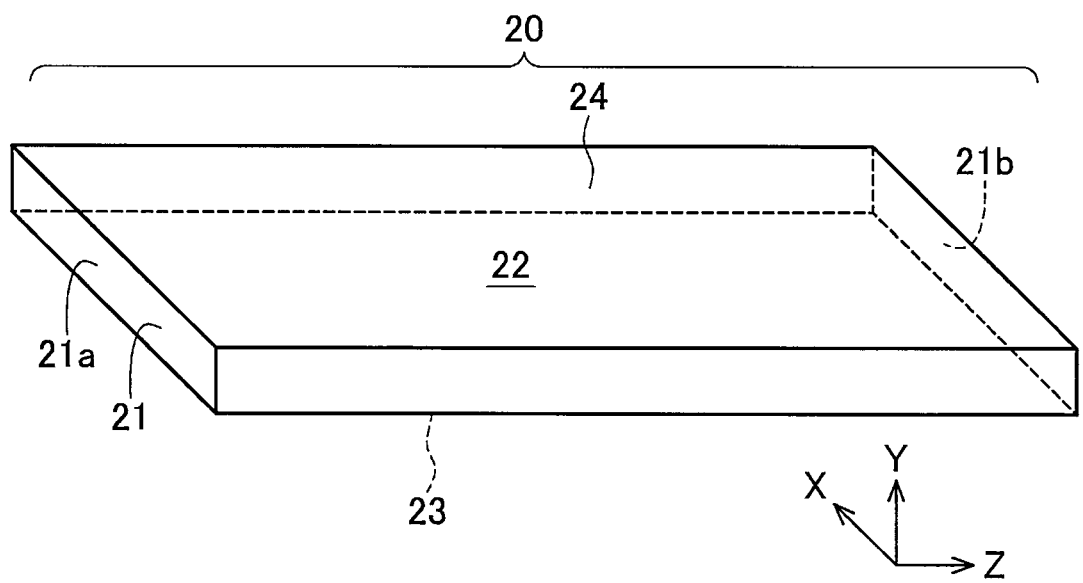
FIG. 4 is a perspective view schematically illustrating a configuration of a diffuser of the lighting device according to the first embodiment.
Figure 5:
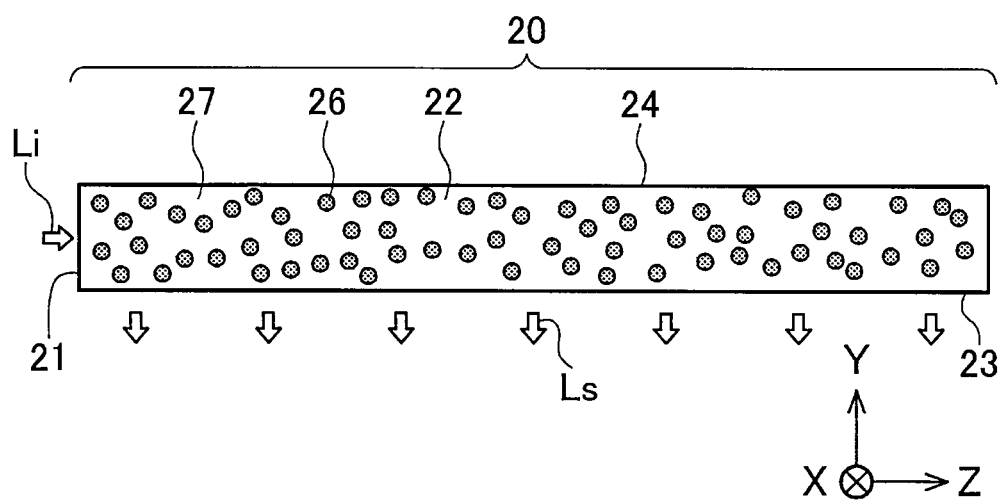
FIG. 5 is a cross-sectional view schematically illustrating the configuration of the diffuser of the lighting device according to the first embodiment.

FIG. 4 is a perspective view schematically illustrating a configuration of the diffuser 20 of the lighting device 100. FIG. 5 is a cross-sectional view schematically illustrating the configuration of the diffuser 20 of the lighting device 100. As illustrated in FIGS. 4 and 5, the light guiding and diffusing portion 22 of the diffuser 20 is, for example, a plate-shaped member. The light guiding and diffusing portion 22 has the front surface 23, the back surface 24, which is a surface opposite the front surface 23, and side surfaces connecting the front surface 23 and back surface 24. One or more of the side surfaces are the at least one light incident surface 21. Also, the front surface 23 and back surface 24 are the light emission surfaces. The at least one light incident surface 21 is formed at at least one edge portion of the light guiding and diffusing portion 22.

Incident light Li generated by the light source 10 enters the light guiding and diffusing portion 22 through the light incident surface 21 of the light guiding and diffusing portion 22 of the diffuser 20. The incident light Li is guided in the light guiding and diffusing portion 22. The incident light Li guided in the light guiding and diffusing portion 22 is referred to as light Lt.

The light guiding and diffusing portion 22 of the diffuser 20 includes the base material 27 and nanoparticles 26. The nanoparticles 26 are particles having a particle size on the order of nanometers. That is, the nanoparticles 26 are particles having a size on the order of nanometers (nm). In general, the nanoparticles 26 are particles having a particle size of one to hundreds of nanometers.

The nanoparticles 26 are spherical, but may have other shapes. The nanoparticles 26 may be exactly spherical or ellipsoidal. The particle size of the nanoparticles 26 is preferably in the range of not less than 10 nm and not more than 300 nm. Also, the particle size of the nanoparticles 26 is more preferably in the range of not less than 60 nm and not more than 150 nm. However, in cases such as when the nanoparticles 26 dispersed in the base material 27 include multiple types of nanoparticles, the particle size of the nanoparticles 26 need not necessarily be in the above range. For example, the base material 27 may include light scattering particles on the order of micrometers that are particles other than the nanoparticles 26. Also, the particle size of the nanoparticles 26 may be not more than 60 nm. For example, the particle size of the nanoparticles 26 may be in the range of not less than 1 nm and not more than 60 nm. Also, the light guiding and diffusing portion 22 may include multiple types of nanoparticles 26, and their respective particle sizes may be the same or different.

Figure 6:
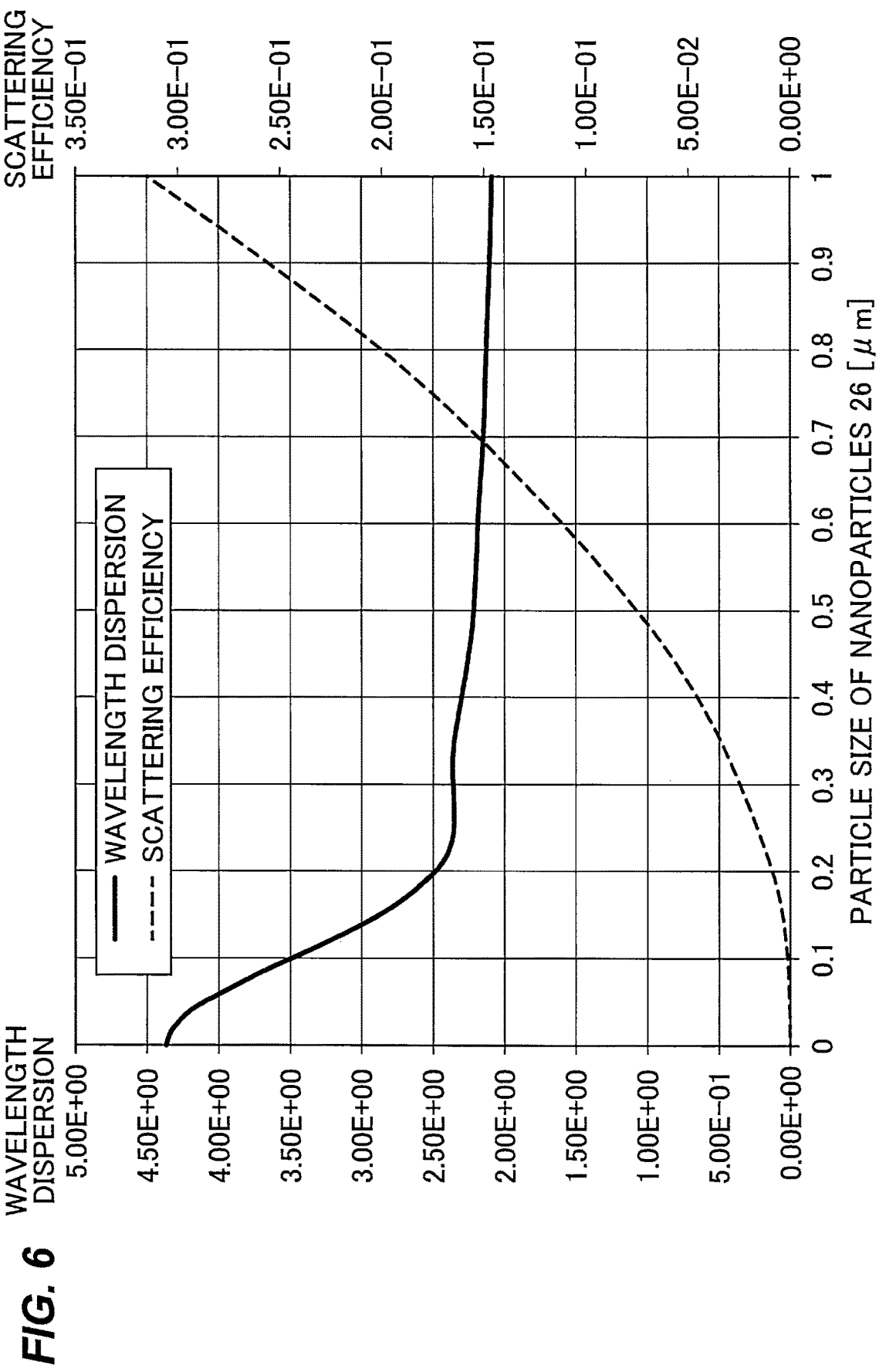
FIG. 6 is a diagram graphically illustrating a relationship between the particle size of nanoparticles and a wavelength dispersion of Rayleigh scattering and a relationship between the particle size of the nanoparticles and a scattering efficiency.

FIG. 6 is a diagram graphically illustrating a relationship between the particle size of the nanoparticles 26 and a wavelength dispersion of Rayleigh scattering, and a relationship between the particle size of the nanoparticles 26 and a scattering efficiency. FIG. 6 illustrates a case where the refractive index of the base material 27, which is a medium of the light guiding and diffusing portion 22, is 1.49 and the refractive index of the nanoparticles 26 is 1.43. In FIG. 6, the horizontal axis represents the diameter (μm) (i.e., $10^3$ nm) of the nanoparticles 26, the left vertical axis represents the wavelength dispersion, and the right vertical axis represents the scattering efficiency. Specifically, the wavelength dispersion indicates a ratio between a scattering probability for light of red wavelengths and a scattering probability for light of blue wavelengths, i.e., $Q_s$ (450 nm)/$Q_s$ (650 nm). Specifically, the scattering efficiency indicates a scattering probability for light of a wavelength of 450 nm, i.e., ($Q_s$(450 nm)).

As illustrated in FIG. 6, the larger the particle size, the lower the wavelength dispersion. For example, in the example illustrated in FIG. 6, the wavelength dispersion is 2.09 when the particle size is 1000 nm (=1 μm), the wavelength dispersion is 2.36 when the particle size is 300 nm (=0.3 μm), the wavelength dispersion is 3.5 when the particle size is 100 nm (=0.1 μm), and the wavelength dispersion is 4.34 when the particle size is 10 nm (=0.01 μm). When the particle size is too large, it is difficult to selectively extract blue light for reproducing the sky. Thus, in terms of reproducibility of the sky color, the particle size is preferably not more than 300 nm.

On the other hand, the smaller the particle size, the lower the scattering efficiency itself. For example, the scattering efficiency is 0.024 (=2.40E-02) when the particle size is 300 nm, the scattering efficiency is 0.0014 (=1.40E-02) when the particle size is 100 nm, and the scattering efficiency is $2.25 \times 10^{-11}$ (=2.25E-11) when the particle size is 10 nm. When the particle size is too small, it is difficult to extract scattered light Ls through the light emission surfaces. As a measure thereagainst, it is conceivable to add a large number of nanoparticles, but this is costly. From the above, the particle size of the nanoparticles 26 is preferably not less than 10 nm.

The nanoparticles 26 are, for example, inorganic oxide. The inorganic oxide is one or more of $ZnO$, $TiO_2$, $ZrO_2$, $SiO_2$, $Al_2O_3$, and the like. The nanoparticles 26 scatter incident light Li to generate scattered light Ls. That is, the nanoparticles 26 scatter guided light Lt to generate scattered light Ls.

The nanoparticles 26 are dispersed in the base material 27. The nanoparticles 26 are formed by being added to the base material 27. The base material 27 is formed from a material that transmits light. The light guiding and diffusing portion 22 is formed by the base material 27 including the multiple nanoparticles 26, for example.

The optical transmittance (or in-line transmittance) of the base material 27 per a light guiding distance of 5 mm is preferably not less than 90% at design wavelength(s). Also, the transmittance is more preferably not less than 95%. Also, the transmittance is still more preferably not less than 99%. Here, the design wavelength(s) refer to predetermined wavelength(s) of the wavelengths of the light emitted from the light source 10. The number of the design wavelength(s) is not limited to one, and may be more than one. In this case, it is preferable that the above value be satisfied for all the design wavelengths. For example, when the light source 10 is a white light source, the design wavelength is, for example, one of 450 nm, 550 mm, and 650 nm. The design wavelength(s) are, for example, in the range of 450 nm to 650 nm.

The base material 27 is solid. For example, the base material 27 is formed from a resin plate using thermoplastic polymer, thermosetting resin, photopolymerizable resin, or the like. Also, for the resin plate, it is possible to use one or more materials of acrylic polymer, olefin polymer, vinyl polymer, cellulosic polymer, amide polymer, fluorine polymer, urethane polymer, silicone polymer, imide polymer, and the like. The base material 27 may be liquid or liquid crystalline.

The diffuser 20 may be an organic-inorganic hybrid resin. The organic-inorganic hybrid resin is, for example, a hybrid resin of resin and inorganic oxide. In this case, the nanoparticles 26 are inorganic oxide particles formed by sol-gel curing with the base material 27 as a base. Also, the diffuser 20 may be, for example, obtained by coating one or both of first and second surfaces of a solid transparent base material with thin film(s) including the nanoparticles 26. In this case, the thin film(s) are the light guiding and diffusing portion 22.

The diffuser 20 has, for example, a plate shape. The diffuser 20 has, for example, a plate shape including two opposite surfaces connected by one or more side surfaces. The front surface 23 is, for example, a surface of the plate shape of the diffuser 20. The plate shape may be a shape other than a flat plate shape. The plate shape may be a curved shape. The plate shape may be a shape such that one or both of the front surface 23 and back surface 24 is curved. The curved shape may be a convex curved shape or a concave curved shape. In the case of a plate shape, the front surface 23 and back surface 24 are taken as the light emission surfaces, for example.

A transmissive functional coating, such as an antireflection coating, an antifouling coating, or a heat shielding coating may be applied to at least one of the front surface 23, back surface 24, and the side surfaces of the diffuser 20.

Also, the diffuser 20 may have, for example, a rod shape. Rod is a general term for column bodies. The column body has a shape having two bases connected by one or more side surfaces. The one or more light emission surfaces are, for example, one or more side surfaces of the rod-shaped column body of the diffuser 20. For example, in the case of a shape, such as a cylindrical rod shape, in which the front surface 23 and back surface 24 of the light emission surfaces cannot be clearly distinguished from each other, it is possible to take, as a front surface, a portion (region) of the light emission surfaces (the side surfaces of the column body) that faces a space in which an observer exists, in a state in which it is installed, and take, as a back surface, a portion (region) opposite thereto, for example.

The first embodiment describes a case where the diffuser 20 has a plate shape. The incident light Li emitted by the light source 10 is incident on the light incident surface 21, which is a side surface. The light incident surface 21 is disposed to face the light emitting surface 11 of the light source 10.

The front surface 23 emits scattered light Ls scattered by the nanoparticles 26. The front surface 23 preferably has high smoothness. This is because, when minute scratches or minute irregularities are produced on a light emission surface (in this case, the front surface 23) in manufacturing, light Lt guided in the diffuser 20 slightly leaks through the front surface 23.

The back surface 24 emits scattered light Ls scattered by the nanoparticles 26. The back surface 24 preferably has high smoothness. This is because, when minute scratches or minute irregularities are produced on a light emission surface (in this case, the back surface 24) in manufacturing, light Lt guided in the diffuser 20 slightly leaks through the back surface 24.

The back surface 24 is a surface opposite the front surface 23. Light Lt guided in the diffuser 20 is reflected and guided by the front surface 23 and back surface 24. The light Lt is guided, for example, by total reflection. The light Lt is guided in the diffuser 20.

For example, the front surface 23 is a surface facing toward an observer. In this case, the scattered light Ls emitted through the back surface 24 is lost. To use the scattered light Ls emitted through the back surface 24, a light reflector for reflecting light may be disposed on the back surface 24 side of the diffuser 20. The light reflector is, for example, a white reflector. The light reflector is, for example, a mirror surface. The light reflector may be a back plate 40 to be described later.

Also, when it is undesirable that the back surface 24 side of the diffuser 20 emit light, e.g., when the lighting device 100 is disposed at a boundary with an outside like a window, a light absorber that absorbs light may be disposed on the back surface 24 side of the diffuser 20. The light absorber is, for example, black. Also, the light absorber may be disposed so that it can open a space on the back surface side. In this case, the lighting device 100 may further include an accommodating portion that accommodates the light absorber.

<<1-3>> Principle of First Embodiment

<<Rayleigh Scattering>>

Figure 7:
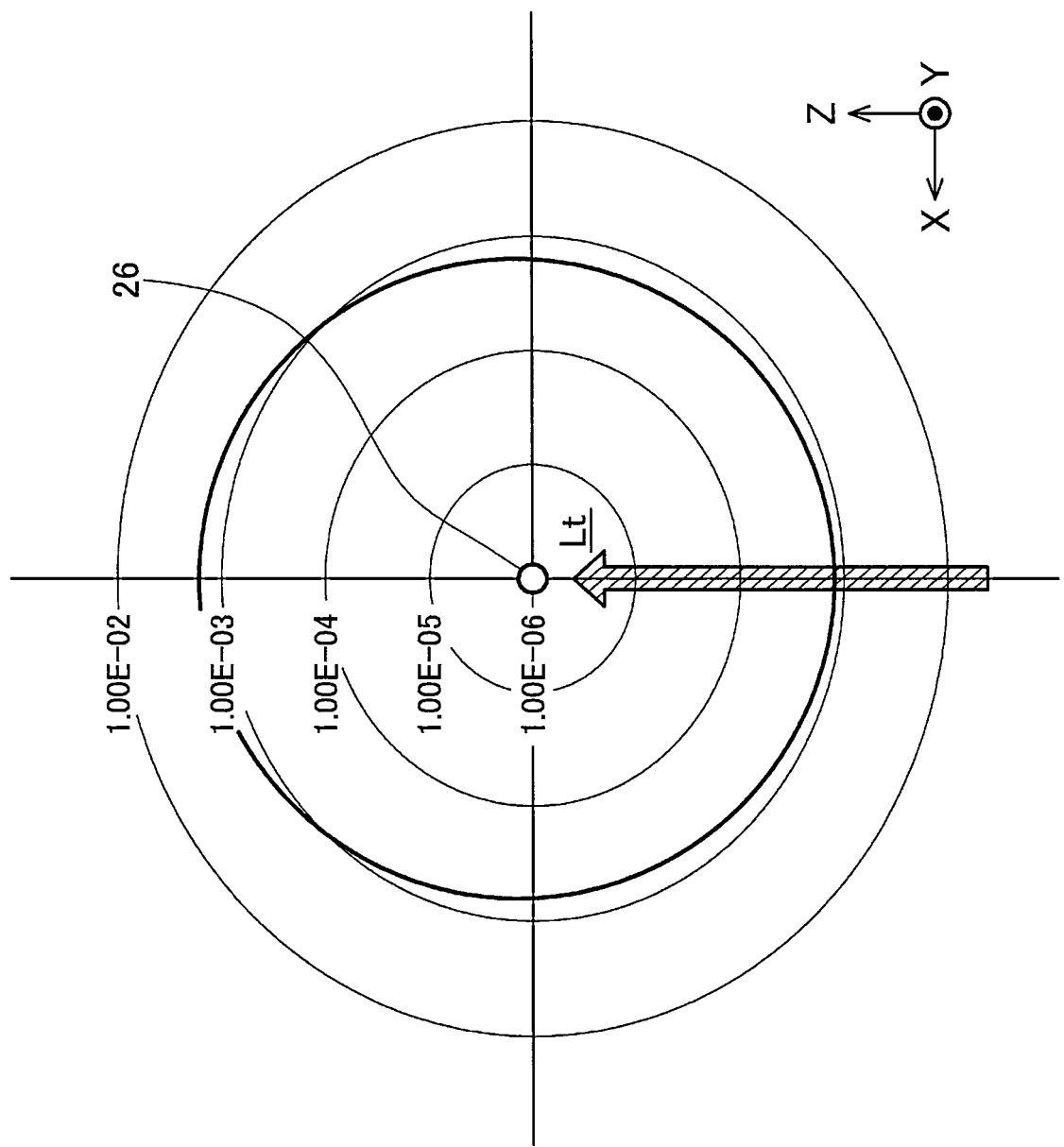
FIG. 7 is a diagram illustrating an example of an angular distribution of intensity of scattered light generated due to Rayleigh scattering by a single nanoparticle.

Rayleigh scattering, which is a light scattering phenomenon, will be described below. FIG. 7 is a diagram illustrating an example of an angular distribution of intensity of scattered light generated due to Rayleigh scattering by a single nanoparticle 26. Light striking the nanoparticle 26 is, for example, light Lt that is emitted from the light source 10, enters the diffuser 20, and is guided in the diffuser 20. In FIG. 7, the +Z direction is a direction parallel to a traveling direction of the light Lt. The light Lt travels in the +Z direction. The X and Y directions are directions perpendicular to the Z direction.

In a case where the particle size of the nanoparticle 26 is smaller than the wavelength of the light (e.g., visible light) Lt, when the light Lt strikes the nanoparticle 26, Rayleigh scattering occurs. The wavelength of the light Lt is, for example, in the range of 380 nm to 780 nm. Specifically, Rayleigh scattering occurs when a size parameter (i.e., a coefficient) α given by the particle size D of the nanoparticle 26 and the wavelength λ of the light Lt satisfies the following formula (1):

$$\alpha << \pi \cdot D / \lambda \quad (1)$$

where the symbol "·" denotes multiplication.

In Rayleigh scattering, a scattering cross-section a is a parameter that indicates the probability of scattering. The scattering cross-section a has the relationship of formula (2) with the particle size D of the nanoparticle 26 and the wavelength λ of the light Lt:

$$\sigma \propto D^6 / \lambda_4. \quad (2)$$

Formula (2) shows that the scattering cross-section a in Rayleigh scattering is inversely proportional to the fourth power of the wavelength λ of the light. Thus, the shorter the wavelength of the light, the higher the probability of Rayleigh scattering.

FIG. 7 illustrates an unpolarized scattered light intensity distribution. The particle size D of the nanoparticle 26 is 100 nm. The particle refractive index n is 1.43. The refractive index of the base material 27 is 1.33. The wavelength λ of the light Lt is 450 nm. As illustrated by the thick solid line, in Rayleigh scattering, the scattered light Ls is emitted substantially uniformly in all directions. Thus, even when light is caused to enter through the light incident surface 21 of the diffuser 20, it is possible to extract scattered light Ls through the light emission surfaces (in this example, the front surface 23 and back surface 24) that are substantially perpendicular to the light incident surface 21.

<<Occurrence of Scattered Light Capable of Simulating Sky>>

Figure 8:
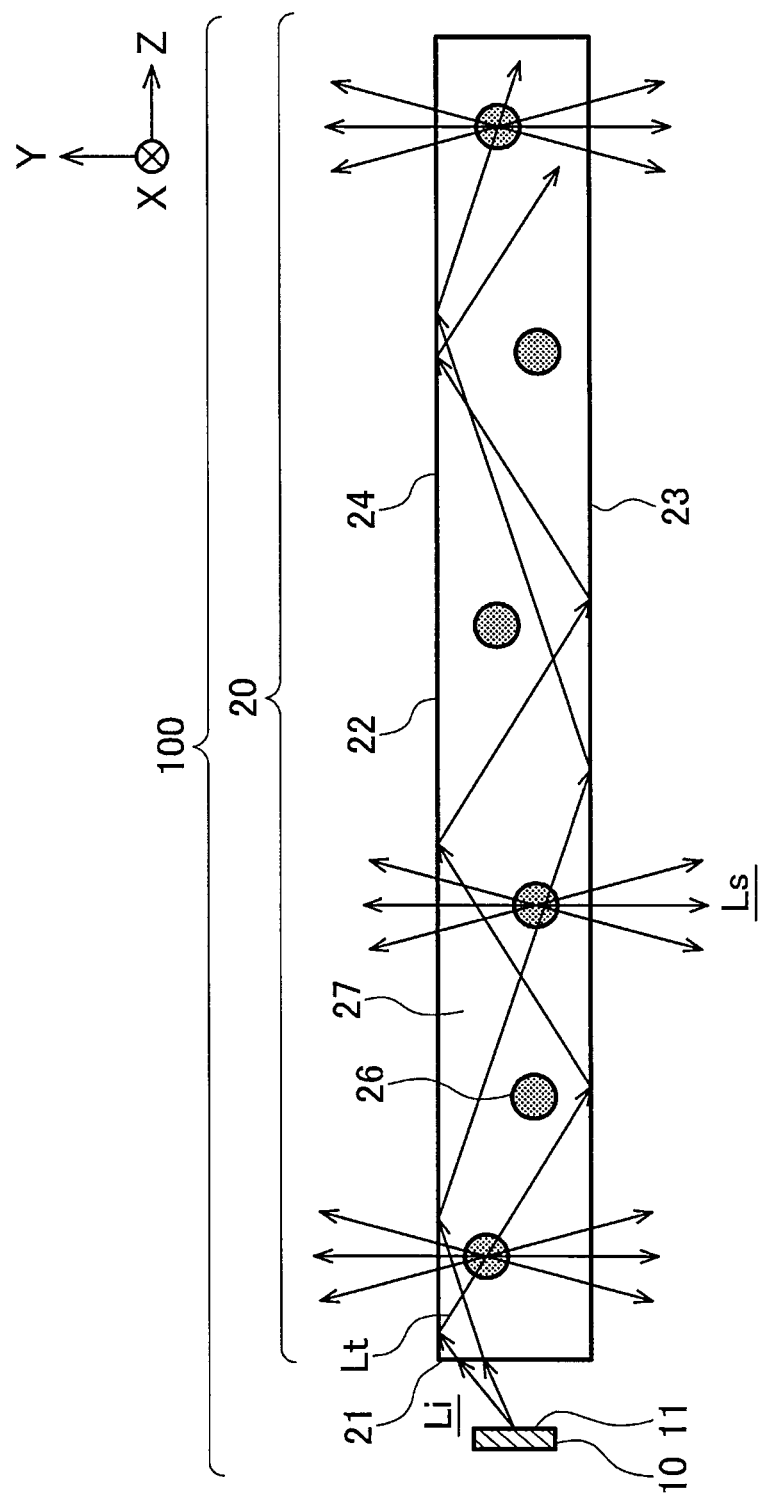
FIG. 8 is a diagram illustrating a situation in which scattered light generated in the diffuser according to the first embodiment is emitted.

The principle of occurrence of scattered light Ls will be described below. FIG. 8 is a diagram illustrating a situation in which scattered light Ls generated in the diffuser 20 according to the first embodiment is emitted. As illustrated in FIG. 8, incident light Li emitted from the light source 10 enters the light guiding and diffusing portion 22 through the light incident surface 21. The entering incident light Li is guided as light Lt in the light guiding and diffusing portion 22. The entering light Lt is reflected by the front surface 23 and back surface 24, which are the light emission surfaces. The reflection here is, for example, total reflection.

In transmitting in the diffuser 20, part of the light Lt strikes the nanoparticles 26. The light Lt striking the nanoparticles 26 scatters in all directions.

Of the scattered light, light incident on the light emission surfaces at incident angles smaller than the critical angle is emitted as scattered light Ls through the light emission surfaces. For example, of the scattered light, light incident on the front surface 23 at incident angles smaller than the critical angle is emitted as scattered light Ls through the front surface 23. Also, for example, of the scattered light, light incident on the back surface 24 at incident angles smaller than the critical angle is emitted as scattered light Ls through the back surface 24. The critical angle refers to the smallest incident angle that yields total reflection when light travels from a medium having a higher refractive index to a medium having a lower refractive index.

Since Rayleigh scattering is caused by the nanoparticles 26 having a particle size smaller than the wavelength λ of the light, scattered light Ls is generated on a nanoscale. Thus, since the sources of generation of the scattered light Ls cannot be seen from an observer, the observer (i.e., a user) feels depth for the diffuser 20. Also, since Rayleigh scattering is a scattering phenomenon that isotropically occurs, the intensity of the scattered light does not change depending on the angle at which the observer sees the diffuser 20. This also allows the observer to feel depth in the diffuser 20. From these, by using Rayleigh scattering, it is possible to allow the observer to have a sense of depth that is the same as a sense of depth that the observer feels for an actual blue sky.

As shown by formula (2), in Rayleigh scattering, the shorter the wavelength of the light, the higher the probability of scattering of the light. Thus, the correlated color temperature of the scattered light Ls is higher than the correlated color temperature of the incident light Li emitted by the light source 10. In the case of one-side incidence, the correlated color temperature of the scattered light Ls may be lower than that of the incident light near an end (which is an edge portion opposite the light incident surface) of a light guiding path of the incident light formed in the diffuser 20. However, in referring to the correlated color temperature, "scattered light Ls" refers to the entire scattered light Ls emitted from the diffuser 20. $T_{ci}$ is the correlated color temperature of the incident light Li emitted by the light source 10. $T_{ci}$ is the correlated color temperature of the scattered light Ls.

The shorter the wavelength of the light, the higher the probability of scattering of the light. Thus, when the incident light Li has a spectral distribution over the entire visible light range, blue light is preferentially scattered. If the light source 10 and diffuser 20 are not properly designed, in the light emission surfaces including the front surface 23, color unevenness or brightness unevenness occurs in an optical axis direction of the light source 10, i.e., in a direction perpendicular to the light emitting surface 11 of the light source 10, and the amount of illumination light is insufficient.

<<Concentration of Nanoparticles 26 in Diffuser 20>>

Figure 9:
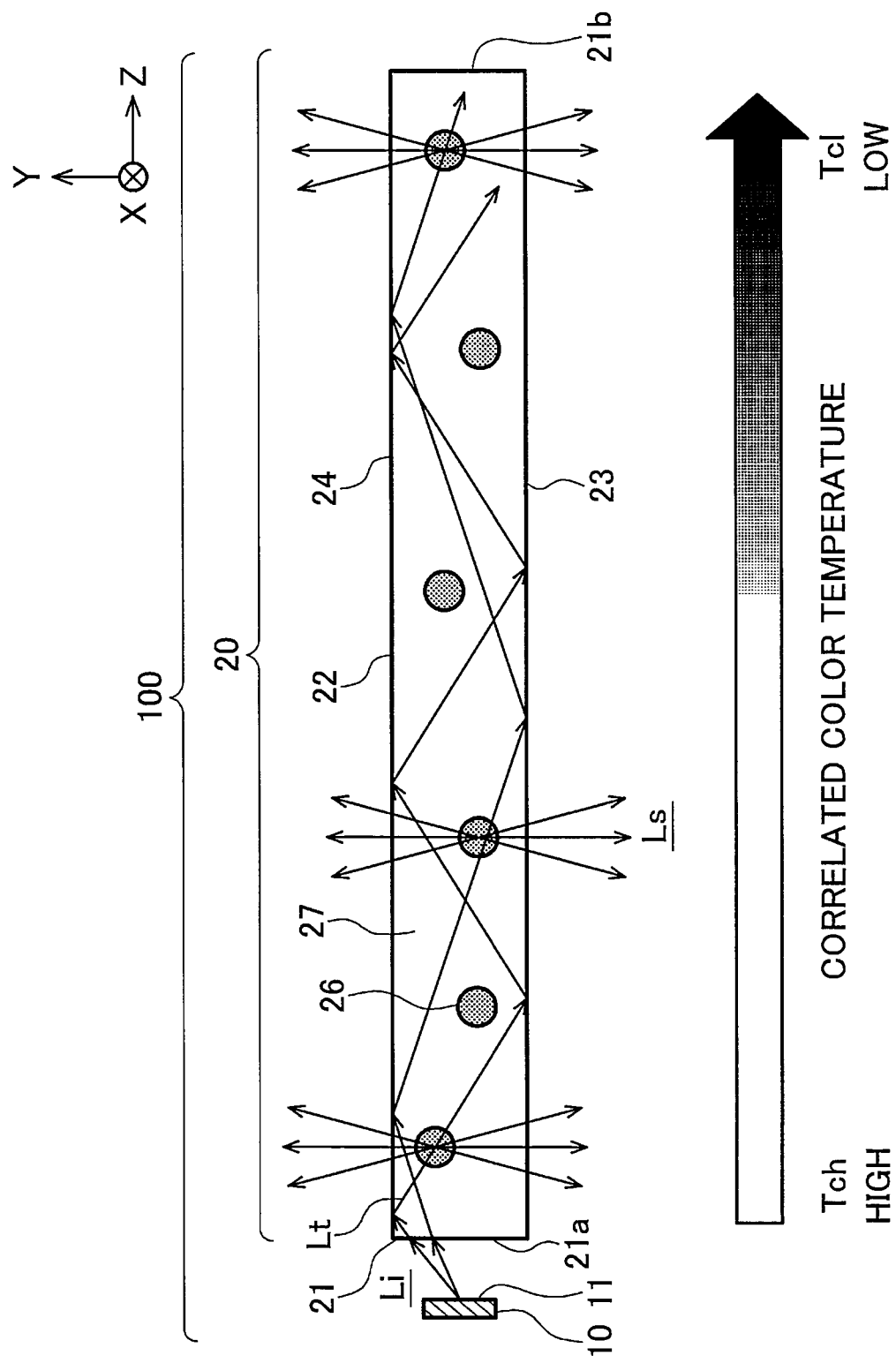
FIG. 9 is a diagram illustrating a relationship between the position in a light guiding direction in a light emission surface of the diffuser according to the first embodiment and the correlated color temperature of the scattered light emitted through the light emission surface.

The concentration of the nanoparticles 26 in the diffuser 20 will be described below. FIG. 9 is a diagram illustrating a relationship between the position in the light guiding direction in the light emission surfaces (in this example, the front surface 23 and back surface 24) of the diffuser 20 according to the first embodiment and the correlated color temperature of the scattered light Ls emitted through the light emission surfaces.

In an edge incidence system in which the light source 10 is disposed at a position facing the light incident surface 21 of the diffuser 20 of the lighting device 100, when the concentration of the nanoparticles 26 included in the diffuser 20 is improper, the amount of illumination light emitted from the lighting device 100 is insufficient, and color unevenness or brightness unevenness occurs in the light emission surfaces (e.g., the front surface 23 and back surface 24).

For example, when the concentration of the nanoparticles 26 included in the diffuser 20 is lower than a proper concentration range, the probability of collision of light Lt guided in the diffuser 20 with the nanoparticles 26 is low. Since the scattered light Ls is generated by collision of light Lt guided in the diffuser 20 with the nanoparticles 26, when the probability of collision of light Lt with the nanoparticles 26 is low, the amount of scattered light Ls emitted from the diffuser 20 is small.

Also, when the concentration of the nanoparticles 26 included in the diffuser 20 is higher than the proper concentration range, color unevenness or brightness unevenness occurs in the light emission surfaces. As shown in formula (2), in Rayleigh scattering, the shorter the wavelength of the light, the higher the probability of scattering of the light. Thus, as the light guiding distance of light Lt guided in the diffuser 20 increases, the short-wavelength component attenuates more greatly than the long-wavelength component.

$T_{ch}$ is the correlated color temperature of the scattered light Ls emitted from a region of the light emission surfaces near the light incident surface 21. $T_{cl}$ is the correlated color temperature of the scattered light Ls emitted from a region of the light emission surfaces far from the light incident surface 21. Thus, the correlated color temperature $T_{ch}$ is higher than the correlated color temperature $T_{cl}$. This is because, as light Lt guided in the diffuser 20 travels away from the light incident surface 21, the number of times of scattering of light Lt increases, and thus the correlated color temperature $T_{cl}$ is lower than the correlated color temperature $T_{ch}$. Thus, the wavelength component of light Lt guided in the diffuser 20 shifts to the long-wavelength side as the light guiding distance increases. Thus, the scattered light Ls also shifts to the long-wavelength side as the light guiding distance increases.

From this, in the diffuser 20, in the light emission surfaces, color unevenness of the scattered light Ls occurs in the optical axis direction (i.e., the Z direction in FIG. 9) of the light source 10. For brightness unevenness, since the amount of scattered light Ls emitted through the light emission surfaces increases toward the light incident surface 21, the brightness in the light emission surfaces increases toward the light incident surface 21 and decreases away from the light incident surface 21. Thus, in the diffuser 20, in the light emission surfaces, brightness unevenness of the scattered light Ls occurs in the optical axis direction of the light source 10. The same applies to, for example, a configuration in which scattered light Ls emitted through the back surface 24 is folded by a back plate or the like to enter the diffuser 20 again and exit through the front surface 23, in that color unevenness or brightness unevenness occurs due to the above reasons.

To properly design the concentration of the nanoparticles 26 included in the diffuser 20, it is necessary to take into account a relationship between the mean free path MFP (mm) and the length $Z_d$ (mm) of the diffuser 20 in the optical axis direction of the light source 10.

In general, a distance that light Lt transmitting in the diffuser 20 travels without being scattered by the nanoparticles 26 is defined as the mean free path MFP. The fact that "MFP is small" indicates that the number of times light Lt guided in the diffuser 20 is scattered by the nanoparticles 26 is large. Conversely, the fact that MFP is large indicates that the number of times light Lt guided in the diffuser 20 is scattered by the nanoparticles 26 is small.

Meanwhile, in the lighting device 100, it is necessary to reduce brightness unevenness and color unevenness in the light emission surfaces. The brightness unevenness and color unevenness occur in the optical axis direction of the light source 10 disposed to face the light incident surface 21 of the diffuser 20. Since light Lt is generally guided in the optical axis direction of the diffuser 20, it is a problem how often light Lt strikes the nanoparticles 26 over the length $Z_d$ in the optical axis direction of the diffuser 20. When the concentration of the nanoparticles 26 included in the diffuser 20 is higher than a proper concentration, the color greatly changes as the distance from the light incident surface 21 increases in the optical axis direction, which is seen as color unevenness by an observer.

Also for brightness, when the concentration of the nanoparticles 26 included in the diffuser 20 is higher than the proper concentration, the brightness greatly decreases as the distance from the light incident surface 21 increases in the optical axis direction, which is seen as brightness unevenness by an observer.

As such, when the concentration of the nanoparticles 26 included in the diffuser 20 is not properly designed, in the lighting device 100, insufficiency of the amount of light and color unevenness or brightness unevenness in the light emission surfaces occur, which is inappropriate for a lighting device. Thus, the concentration of the nanoparticles 26 included in the diffuser 20 needs to be properly designed.

To prevent insufficiency of the amount of light and color unevenness or brightness unevenness due to an improper concentration of the nanoparticles 26 included in the diffuser 20 as described above, it is preferable that the concentration of the nanoparticles 26 in the diffuser 20, or the number N (particles/mm$^3$) of the nanoparticles 26 in a unit volume, satisfy relational formula (3) between the mean free path MFP (mm) for light of a design wavelength and the length $Z_d$ (mm) of the diffuser 20 in the light guiding direction. Here, the coefficient α is a ratio of the length $Z_d$ to MFP. Here, it is assumed that the wavelength (design wavelength) when MFP is determined is 550 nm.

Besides 550 nm, the design wavelength can be set to, for example, a wavelength in the range of 450 nm to 650 nm. However, MFP (more specifically, $Q_s$) is a parameter correlated with the above-described scattering cross-section a, and as the wavelength λ of the light changes, MFP changes by an amount corresponding to the fourth power of the change in the wavelength. Thus, when the design wavelength is set to a wavelength other than 550 nm, the preferred range of a described in the present application needs to be changed to a value obtained by adding an amount corresponding to the fourth power of the difference from the wavelength 550 nm.

In the first embodiment, the diffuser 20 is formed to satisfy $$MFP=1/(\beta N)=\alpha Z_d,$$

$$\beta=\pi \times A^2 \times Q_s,$$

$$0.4 \leq \alpha \leq 5. \tag{3}$$

Here, A is an average particle size (mm) of the nanoparticles 26, and $Q_s$ is a scattering efficiency (non-dimensional) determined by a combination of the nanoparticles 26 and base material 27.

The average particle size of the nanoparticles 26 refers to, for example, a volume average particle radius (i.e., a volume weighted average radius). The particle size distribution of the nanoparticles 26 may be a distribution that is monodisperse or a distribution that is not monodisperse. When it is a distribution that is not monodisperse (i.e., dispersed), MFP may be calculated by using the average particle size. The nanoparticles 26 included in the diffuser 20 may be particles having multiple different particle sizes. Also when nanoparticles 26 having different particle sizes are included, MFP may be calculated with the volume average particle radius as the average particle size A.

Also, the range of the coefficient α may be changed depending on the intended use of the lighting device. For example, when the light use efficiency is considered to be important, the ratio α of the length $Z_d$ to MFP may be set to be not more than 3.2 (e.g., in the range of 0.4≤α≤3.2). When the coefficient α is in the above range, a light use efficiency represented by a ratio of a luminous flux (lm) of the scattered light Ls to a luminous flux (lm) of the incident light Li emitted from the light source 10 can be made to be not less than 10% (more specifically, in the range of about 10 to 50%). Also, when the coefficient α is set to be not more than 1.47, the light use efficiency can be made to be not less than 20%. Further, when the coefficient α is set to be not more than 0.085, the light use efficiency can be made to be not less than 30%. Here, the scattered light Ls in the light use efficiency refers to the scattered light Ls emitted through the light emission surfaces (in the example illustrated in FIGS. 4 and 5, the front surface 23 and back surface 24) of the diffuser 20.

Also, for example, when it is considered to be important to reduce color unevenness or brightness unevenness in the light emission surfaces of the diffuser 20 of the lighting device 100, the coefficient α may be set to be not less than 0.72 (e.g., in the range of 0.72α≤5). In the above range of the coefficient α, although the light use efficiency is about 5 to 20%, the color unevenness and brightness unevenness can be more reduced. For example, when the coefficient α is not less than 0.72, in a both-side light entrance configuration as described later, a color variation (non-dimensional) can be made to be not more than 0.04, the color variation being represented by the largest of the differences between a chromaticity (center chromaticity) at a center position of the light emission surfaces and chromaticities at other positions (such as peripheral positions) of the light emission surfaces. In a one-side light entrance configuration, the same effect is obtained by setting the coefficient α to be not less than 1.23. Also, for example, the color variation can be made to be not more than 0.02 when the coefficient α is not less than 1.6 in the both-side light entrance configuration and when the coefficient α is not less than 1.2 in the one-side light entrance configuration. Thus, for example, even when the length $Z_d$ is long, it is possible to reduce color unevenness or brightness unevenness, and reproduce the sky well.

The preferred range of α is independent of the length $Z_d$. However, as the length $Z_d$ increases, it becomes more difficult to reduce the color unevenness or brightness unevenness, and adjust the particle concentration in view of multiple design parameters such as the light use efficiency, without a guide such as the relational formula as described above. Thus, the larger the length $Z_d$ of the diffuser 20, the more preferably the condition represented by the above relational formula is applied to the diffuser 20. For example, the length $Z_d$ may be 50 mm to 2000 mm.

When the diffuser 20 has multiple side surfaces having different lengths, the light incident surface 21 may be provided at an edge portion having a short length. For example, when the diffuser 20 is plate-shaped and the main surfaces (e.g., the front surface 23 and back surface 24) have rectangular shapes with long sides and short sides, a light source may be provided to face a side surface corresponding to long sides such that the length of the short sides is the length $Z_d$.

Also, the light incident surface 21 may be formed at more than one edge portion. For example, the light incident surface 21 may be formed at a first edge portion 21a (e.g., a side surface) of the diffuser 20 and a second edge portion 21b (e.g., a side surface) located opposite the first edge portion. In this case, the light source 10 may include multiple light emitting elements, including a first light source portion 11a facing the first light incident surface 21a and a second light source portion 11b facing the second light incident surface, and be disposed so that incident light Li is incident on each of a first light incident surface formed at the first edge portion 21a and a second light incident surface formed at the second edge portion 21b.

By providing a configuration (both-side light entrance) in which the light source 10 is disposed to face the two light incident surfaces 21 located opposite each other, of the multiple side surfaces of the diffuser 20, as described above, the advantage of reducing color unevenness or brightness unevenness in the light emission surfaces including the front surface 23 is obtained. Thus, by providing the light incident surface at the two edge portions 21a and 21b located opposite each other, it is possible to increase the lower limit of the coefficient α (about twofold) compared to the one-side light entrance. Thus, it is possible to set the addition concentration of the nanoparticles 26 to be high and satisfy a condition for increasing the light use efficiency. On the other hand, in the case of a configuration (one-side light entrance) in which the light source 10 is disposed at only one of the multiple side surfaces of the diffuser 20, since it is impossible to compensate for the color unevenness or brightness unevenness in the light guiding direction by light incidence from the opposite side, a condition in which the value of the coefficient α is large, or a condition in which the addition concentration of the nanoparticles 26 is low, is applied, compared to the both-side light entrance. As described in Examples to be described later, since there is no difference in light use efficiency between the both-side light entrance and the one-side light entrance, the range (in particular the upper limit) of α can be set regardless of whether it is both-side or one-side.

Also, when the light source 10 is disposed at edge portions having different lengths $Z_d$, such as when the diffuser 20 is rectangular and the light source 10 is disposed to face two or more perpendicular side surfaces of the rectangular diffuser 20 in order to increase the amount of light from the lighting device 100, it is preferable to use the longer value as the length $Z_d$ of the diffuser 20 in the optical axis direction in formula (3). Thereby, the color unevenness or brightness unevenness can be reduced in each of the light guiding directions in the diffuser 20.

In this case, it is more preferable to satisfy the following relationship:

$$L_{short} > 0.08 L_{long} \qquad (4)$$

where $L_{long}$ is the length of the long side, and $L_{short}$ is the length of the short side.

This is because, if the concentration is set by taking the length of the short sides of the side surfaces as the length $Z_d$, since the concentration of the nanoparticles 26 is high for light Lt emitted from a light source 10 with an optical axis direction along the long sides, and the color unevenness or brightness unevenness is likely to occur. Also, when light sources 10 are disposed at two or more side surfaces, an average value of light use efficiencies for the respective light sources 10 is taken as the light use efficiency.

Also, when the diffuser 20 has a thin flat plate shape such that the length $Z_d$ of the diffuser 20 is sufficiently larger than a thickness $Y_d$ (mm) in a direction from the front surface 23 (or back surface 24) toward the back surface 24 (or front surface 23), the light use efficiency and the color unevenness or brightness unevenness depend on the length $Z_d$ and MFP, and the effect of the thickness $Y_d$ can be ignored. However, depending on a relationship in size between the length $Z_d$ and the thickness $Y_d$, in some cases, the effect of the thickness $Y_d$ cannot be ignored.

For example, when the thickness $Y_d$ is larger than the length $Z_d$, in order for scattered light Ls scattered by the nanoparticles 26 to exit through the front surface 23 or back surface 24, the scattered light Ls needs to be guided over a distance corresponding to the thickness $Y_d$, and it is further scattered before it reaches the front surface 23 or back surface 24. Thus, the correlated color temperature of the scattered light Ls emitted through the front surface 23 or back surface 24 is lower than a desired correlated color temperature, and it is not possible to obtain scattered light Ls having the desired correlated color temperature. Thus, to allow the effect of the thickness $Y_d$ to be ignored, the ratio of the thickness $Y_d$ to the length $Z_d$ of the diffuser 20 is preferably 0.25% to 20%, and more preferably 0.5% to 10%.

In a lighting device in which a light source is disposed on a back surface side of a diffuser (i.e., a rear projection lighting device), in order to allow an observer to see the light source behind the diffuser 20 as the sun, straight light as illumination light having a warm chromaticity and simulating direct sunlight, and blue scattered light for allowing a light emission surface to be seen as a blue sky are emitted from the diffuser 20. To reproduce a natural blue sky including such sunlight and blue scattered light, the light source is limited to a white light source having a wavelength distribution close to the solar spectrum, and the optimum concentration of the Rayleigh diffuser is determined by the chromaticity of the scattered light to a concentration that allows a proper wavelength dispersion to be exhibited with respect to light from the light source. Thus, in the rear projection system, only white light sources having spectra close to that of sunlight can be used to reproduce a natural blue sky, and the optimum concentration of the nanoparticles in the Rayleigh diffuser is determined depending on the chromaticity of scattered light generated when light from the white light source enters the diffuser 20.

In the edge incidence system employed in the first embodiment, the illumination light may be formed by only the scattered light. In this case, the light use efficiency is interpreted in a different way, and in the edge incidence system, it is necessary to obtain a sufficient amount of light for illumination by using only the scattered light. Also, in the conventional projection system, the angle formed by a light guiding direction of the diffusion generator and the emission direction (a direction substantially perpendicular to the light emission surface) is small, and color unevenness or brightness unevenness depending on the length of the diffusion generator in the light guiding direction or the nanoparticle concentration is less likely to be seen. However, in the edge incidence system, the angle formed by the light guiding direction and the emission direction is large (a substantially right angle), and color unevenness or brightness unevenness appears noticeably depending on the length in the light guiding direction and the nanoparticle concentration.

Also, in the edge incidence system, since an observer does not directly see the light source, any light source color can be used. Thus, it is possible to separately consider the concentration of the nanoparticles in the Rayleigh diffuser and the chromaticity of the scattered light, and it is possible to optimize the nanoparticle concentration and the light source characteristics, depending on characteristics to be provided.

As described above, in the first embodiment, in view of reduction in light use efficiency and brightness unevenness or color unevenness, which are problems specific to the edge incidence system, there has been found a relationship between the optimum concentration of the nanoparticles 26 in the diffuser 20, the length $Z_d$ in the optical axis direction of the diffuser 20, and the mean free path MFP. By properly setting the concentration of the nanoparticles 26 in the diffuser 20 according to this relationship, it is possible to reduce color unevenness or brightness unevenness in the light emission surfaces of the diffuser 20 while providing a sufficient amount of light for illumination, in the lighting device 100, which can have various sizes or shapes.

When the intended purpose is to represent a natural sunset glow, the range of the coefficient α is not limited to above. For example, when the lighting device 100 is used as a slit-shaped window that is vertically long (or long in a direction from a floor toward a ceiling) and intended to be installed in a wall, the addition concentration of the nanoparticles 26 may be set with respect to a length $Z_d$ in a short side direction of the diffuser 20. Thereby, in the daytime, it is possible to represent a blue sky by turning on a light source 10 provided to one of the side surfaces of the diffuser 20 corresponding to a long side, and in the evening, by turning on a light source 10 provided to one of the side surfaces corresponding to a short side, e.g., on the ceiling side, it is possible to make the correlated color temperature of the scattered light Ls decrease toward the floor and represent a natural sky at sunset in which the redness increases toward the horizon, for example.

<<Use of Light Emitting Elements 13 of Multiple Colors in Light Source 10>>

Figure 10:
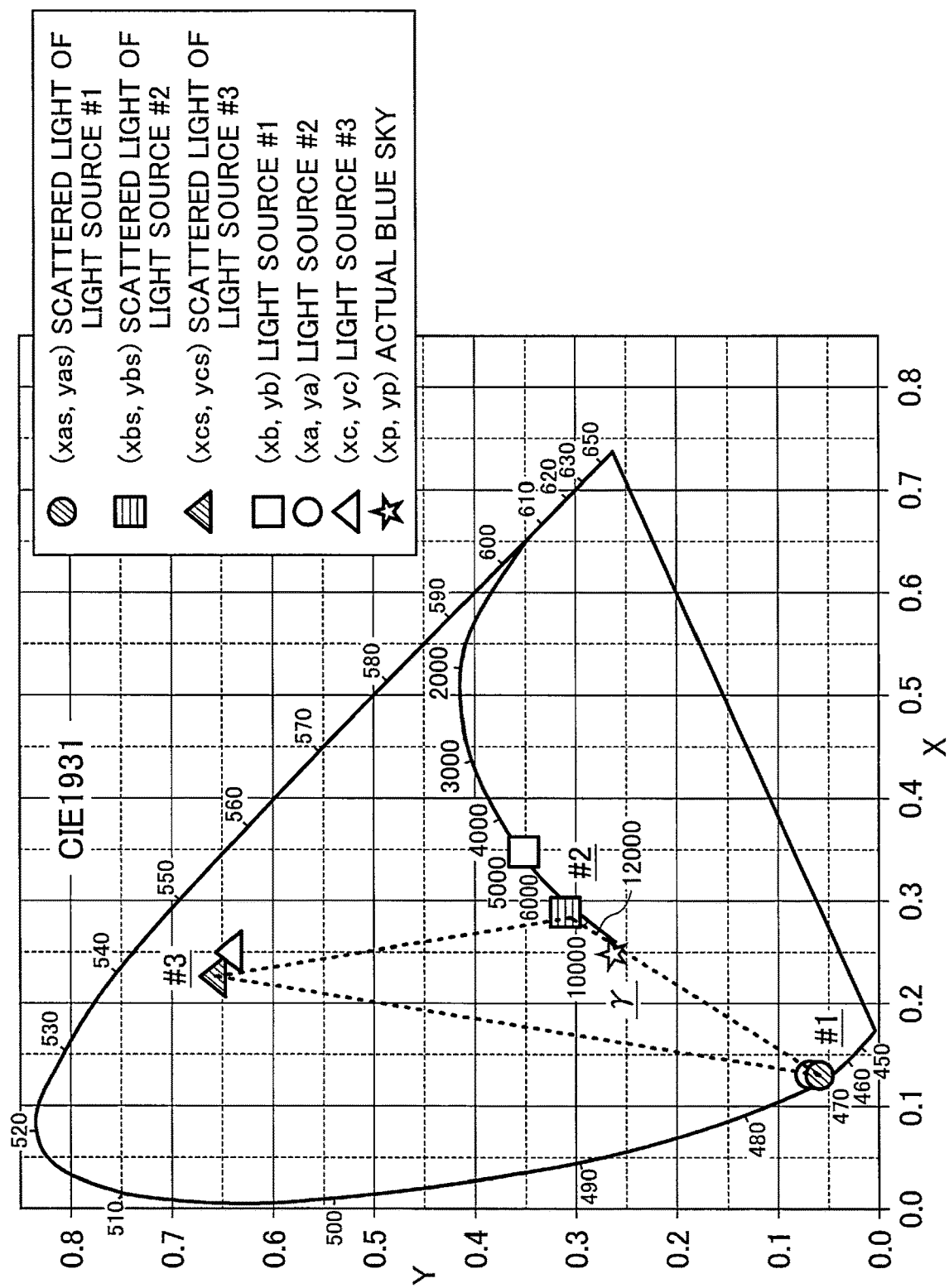
FIG. 10 is a diagram illustrating, on a CIE 1931 chromaticity diagram, an example of chromaticities of scattered light generated in the diffuser according to the first embodiment.

Hereinafter, further advantages obtained by providing light emitting elements 13 of multiple colors in the light source 10 will be described. FIG. 10 is a diagram illustrating, on a CIE 1931 chromaticity diagram, an example of chromaticities of scattered light generated in the diffuser 20.

In the rear projection system, since the light source is seen by an observer, only white light sources having spectra close to the solar spectrum can be used. For example, it is not possible to change the illumination color, e.g., to reproduce a change in the look of the sky by changing the light source color. On the other hand, in the edge incidence system, since the light source 10 is not directly seen by an observer, it is possible to use multiple colors in the light emitting elements 13 provided in the light source 10, and by changing the color of the illumination light, it is possible, for example, to reproduce a change in the look of the sky, the variation in blue sky color between regions, or the like.

The light source 10 includes two or more light emitting elements 13 having different emission colors. When the light source 10 includes light emitting elements 13 (denoted as #1, #2, and #3 in FIG. 10) that emit light of three different colors, the design is made so that a design chromaticity ($x_p,y_p$) is included in a region obtained by connecting, with straight lines, chromaticities ($x_{as}$, and ($x_{bs},y_{bs}$)$_r$ ($x_{c_s},y_{c_s}$) of the scattered light Ls at a center position of the light emission surfaces of the diffuser 20 in the light guiding direction when each light emitting element 13 is turned on alone. In FIG. 10, the chromaticities ($x_a,y_a$), ($x_b,y_b$) and ($x_c,y_c$) are chromaticities of light emitted by the light sources #1, #2, and #3. Also, ($x_p,y_p$) indicates a chromaticity corresponding to an actual blue sky.

The same applies to the case where three or more light sources having different emission colors are provided. Specifically, the diffuser 20 is designed so that the design chromaticity ($x_p,y_p$) is included in a region obtained by connecting, with straight lines, chromaticities ($x_{as},y_{as}$), ($x_{bs},y_{bs}$), ($x_{c_s},y_{c_s}$), . . . of the scattered light Ls at the center position of the light emission surfaces of the diffuser 20 in the light guiding direction when each light emitting element 13 is turned on alone.

Here, including the design chromaticity indicates that, as illustrated in FIG. 10, when chromaticities of the scattered light Ls in a central portion including the center position of the light emission surfaces in the light guiding direction generated when each light emitting element 13 is turned on alone are plotted on a chromaticity diagram, the design chromaticity ($x_p,y_p$) is included in a region γ (e.g., the triangular region in FIG. 10) enclosed by straight lines (e.g., the dashed lines in FIG. 10) connecting the points of the plotted chromaticities or located on the straight lines. The portion on the straight lines is included in the region γ. When the light source 10 includes, for example, two different light emitting elements 13, the light source 10 may be designed so that the design chromaticity ($x_p,y_p$) is located on a straight line connecting chromaticities ($x_{as},y_{as}$) and ($x_{bs},y_{bs}$) of the scattered light Ls in the central portion of the light emission surfaces of the diffuser 20 when each light emitting element 13 is turned on alone. The design chromaticity is also referred to as a target chromaticity.

As an example, when incident light Li having a low color temperature, e.g., 3000 K, is caused to enter a diffuser 20 that is designed to generate scattered light Ls having a color temperature comparable to that of a blue sky when a light source 10 that emits incident light Li having a high color temperature, e.g., 6500 K is used, the scattered light Ls emitted from the diffuser 20 has a color temperature lower than the color temperature of the blue sky. Thus, by properly selecting the color temperature of the light source used, the color temperature of the scattered light Ls can be controlled to a color temperature, e.g., 5000 K, comparable to that of white. The above has described an adjustment example in which the design chromaticity ($x_p,y_p$) is enclosed with the chromaticities of the scattered light Ls in the central portion in view of color unevenness. However, for example, instead of the chromaticities of the scattered light Ls in the central portion, it is possible to take, as ($x_{as},y_{as}$), ($x_{bs},y_{bs}$), ($x_{cs},y_{cs}$), . . . , average chromaticities in the light emission surfaces of the scattered light Ls emitted through the light emission surfaces of the diffuser 20 when the light emitting element of each color is turned on alone.

The light source 10 need not necessarily include multiple light emitting elements 13 to emit light of multiple colors. For example, in the case of simulating only a blue sky, it is possible to use only a light source 10 that emits light of a color such that the chromaticity of the scattered light Ls in the central portion or the average chromaticity of the scattered light Ls in the surfaces is the design chromaticity. Such a light source 10 can be implemented by, for example, a single LED light source obtained by combining a light emitting element that emits light of the color of a blue sky with an appropriate phosphor.

Here, to reproduce the color of a natural blue sky in fair weather, the design chromaticity is preferably $(x_p,y_p)=(0.25,0.27)$, and the variation of each of the components, i.e., $x_p$ and $y_p$, is preferably within ±0.03, and more preferably within ±0.01. That is, to reproduce the color of a natural blue sky in fair weather, the design chromaticity is preferably $(x_p,y_p)=(0.25\pm0.03,0.27\pm0.03)$, and more preferably $(x_p,y_p)=(0.25\pm0.01,0.27\pm0.01)$.

The design chromaticity takes various values depending on personal preference or the like, and for example, to reproduce a blue sky color closer to a memory color than to an actual color, the design chromaticity is preferably $(x_p,y_p)=(0.23,0.23)$.

As above, the light source 10 may be a combination of light emitting elements 13 of colors such that the design chromaticity ($x_p,y_p$) is enclosed with chromaticities in the central portion of the light emission surfaces of the diffuser 20 when each light emitting element 13 is turned on alone, on the chromaticity diagram. However, the number of design chromaticities ($x_p,y_p$) is not necessarily one, and when it is intended to represent multiple colors, such as the color of a sky at sunset or the color of a cloudy sky, in the light emission surfaces, it is more preferable that all the target chromaticities ($x_{p1},y_{p1}$), ($x_{p2},y_{p2}$), . . . be enclosed.

For the purpose of simulating the natural sky, as already described, the light source 10 is more preferably a combination including a blue, green, or white light emitting element 13, and still more preferably a combination of blue, green, and white light emitting elements 13. Moreover, for example, to represent the sunset, an orange light emitting element 13 may be combined.

By virtue of the light source 10 including light emitting elements 13 of multiple colors, the lighting device 100 can reproduce a natural blue sky color, and further can represent all the colors on the chromaticity diagram enclosed by the chromaticities in the central portion of the light emission surfaces of the diffuser 20 when each light emitting element 13 is turned on alone. Thus, it is possible to represent various sky conditions or the variation in sky color depending on the hours. For example, when the light source 10 includes a blue light emitting element, a green light emitting element, and a white light emitting element, it is possible, for example, to represent the chromaticity of a cloudy sky by increasing the proportion of the amount of white light with respect to the ratio between the amounts of light of the respective colors when the chromaticity, e.g., (0.25,0.27), of a daytime blue sky is represented. Also, by increasing the proportion of the amount of blue light with respect to the ratio between the amounts of light of the respective colors when a blue sky is represented, it is possible, for example, to represent the chromaticity of an evening or after-dark sky around the zenith.

As above, by properly designing the addition concentration of the nanoparticles 26 in the diffuser 20 according to the relational formula between MFP and the length $Z_d$ of the diffuser 20 in the optical axis direction of the light source 10, it is possible for the lighting device 100 to reduce color unevenness or brightness unevenness in the light emission surfaces of the diffuser 20 while ensuring the brightness necessary for a lighting device. Moreover, by including light emitting elements 13 of multiple colors in the light emitting elements 13 included in the light source 10, it is possible not only to represent a natural blue sky color, but also to represent various sky conditions or the variation in sky color depending on the hours.

As an example, when incident light Li having a low color temperature, e.g., 3000 K, is caused to enter a diffuser 20 that is designed to generate scattered light Ls having a color temperature comparable to that of a blue sky when a light source 10 (light emitting element 13) that emits incident light Li having a high color temperature, e.g., 6500 K is used, the scattered light Ls emitted from the diffuser 20 has a color temperature lower than the color temperature of the blue sky. Thus, by properly selecting the color temperature of the light source used, the color temperature of the scattered light Ls can be controlled to a color temperature, e.g., 5000 K, comparable to that of white.

The light source design method based on a relationship between the central or average chromaticities of the scattered light and the target chromaticity in generating scattered light of a desired color from the diffuser 20 by using multiple light emitting elements that emit different colors, as described above, can be applied to purposes other than simulating a blue sky.

<<1-4>> Advantages of First Embodiment

As described above, with the diffuser 20 and lighting device 100 according to the first embodiment, it is possible to reproduce a natural blue sky as if there were a window.

Also, for example, the diffuser 20 can be made to have a thin structure not more than 100 mm, and can represent a blue sky with a sense of depth and natural light in a room.

Moreover, by a control that changes the amounts of light emitted by multiple LED elements of different colors with automatic setting, it is possible to reproduce not only a blue sky but also a sunrise glow, a sunset glow, or the like.

<<2>> Second Embodiment

Figure 11:
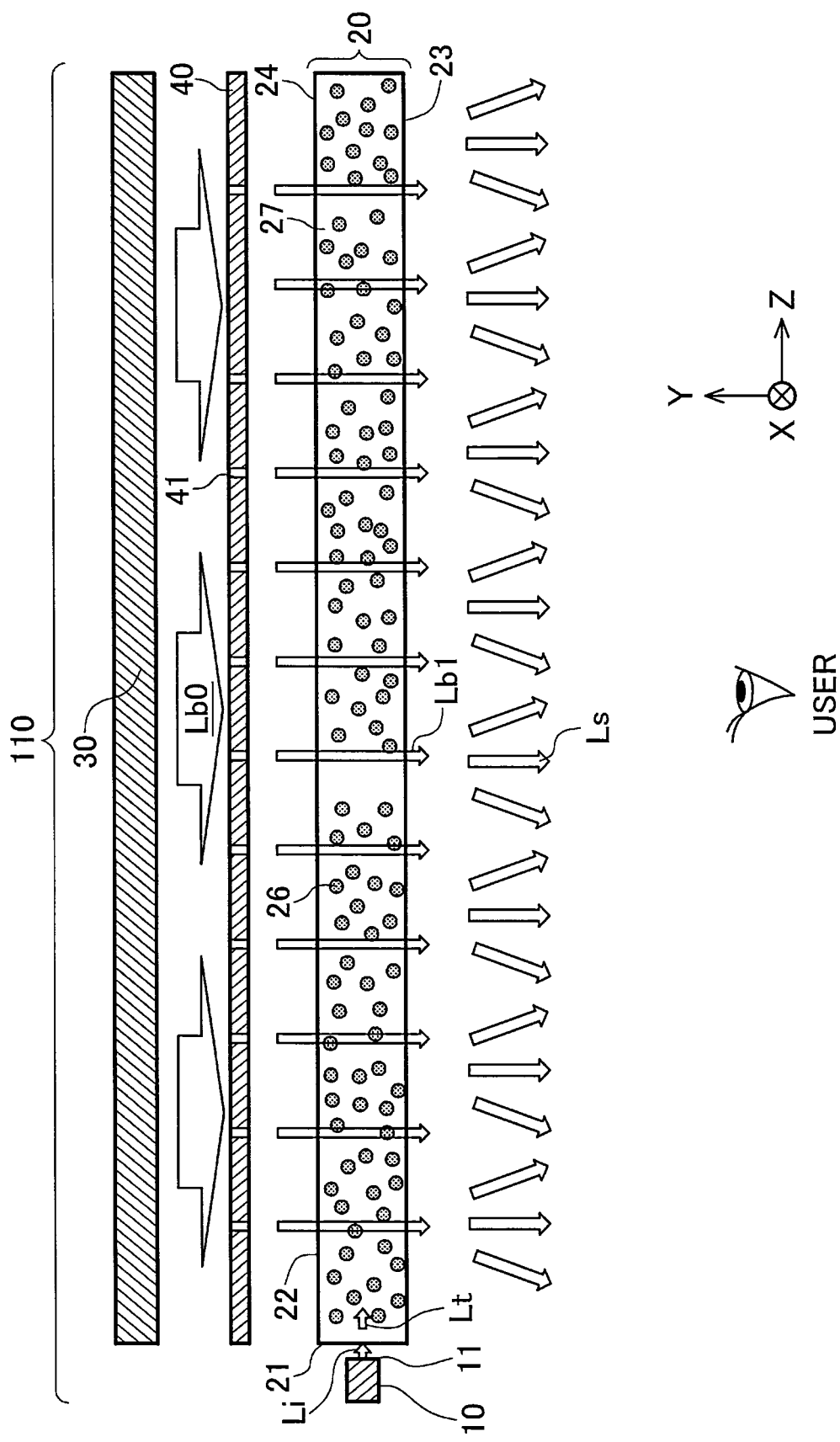
FIG. 11 is a cross-sectional view schematically illustrating a configuration of a lighting device according to a second embodiment.

FIG. 11 is a cross-sectional view schematically illustrating a configuration of a lighting device 110 according to a second embodiment. In FIG. 11, elements that are the same as or correspond to elements illustrated in FIG. 8 are given reference characters that are the same as reference characters illustrated in FIG. 8. The lighting device 110 according to the second embodiment differs from the lighting device 100 according to the first embodiment in that it includes a back light source 30 and the back plate 40. Otherwise, the lighting device 110 according to the second embodiment is the same as the lighting device 100 according to the first embodiment.

The back light source 30 is disposed on the back surface 24 side of the diffuser 20, and emits light Lb toward the back plate 40. The back light source 30 may include multiple light emitting elements having optical axis directions substantially perpendicular to the light emission surfaces of the diffuser 20, as with a direct backlight of a liquid crystal display, for example. The back plate 40 is disposed between the back light source 30 and the back surface 24 of the diffuser 20. The back plate 40 may include, for example, a light deflection element, such as a prism sheet. The back plate 40 may include a diffusion plate that diffuses light.

Also, the back light source 30 may include one or more light emitting elements having optical axis directions substantially parallel to the light emission surfaces of the diffuser 20 and a light guide plate that guides light Lb emitted from the light emitting elements, as with an edge backlight of a liquid crystal display, for example. Moreover, a light deflection element, such as a prism sheet, or a diffusion plate that diffuses light may be provided between the light guide plate and the diffuser 20, for example.

The back plate 40 has a light transmission characteristic that allows at least part of light emitted from the back light source 30 to transmit through the back plate 40 and be incident on the back surface 24 of the diffuser 20. A surface of the back plate 40 on the diffuser 20 side may be white so that it diffuses and reflects light emitted through the back surface 24 of the diffuser 20, for example. Also, the back plate 40 may be a light absorber so that it absorbs light emitted through the back surface 24 of the diffuser 20. Also, a picture, such as a picture of clouds, may be drawn on the back plate 40.

The back plate 40 may include multiple fine holes 41 passing through the back plate 40 in a thickness direction. Cross-sectional shapes of the fine holes 41 in a plane perpendicular to the thickness direction of the back plate 40 may be, for example, circular or elliptical. The cross-sectional shapes of the fine holes 41 may be other shapes. Also, the inner surfaces of the fine holes 41 may have the same surface characteristics as the surface of the back plate 40 on the diffuser 20 side, and for example may have a scattering characteristic. The inner surfaces of the fine holes 41 may have surface characteristics different from those of the surface of the back plate 40 on the diffuser 20 side, and for example may have a light absorption characteristic. Also, the fine holes 41 are, for example, not more than 5 mm in diameter. The fine holes 41 are more preferably not less than 3 mm and not more than 5 mm in diameter.

Figure 12:
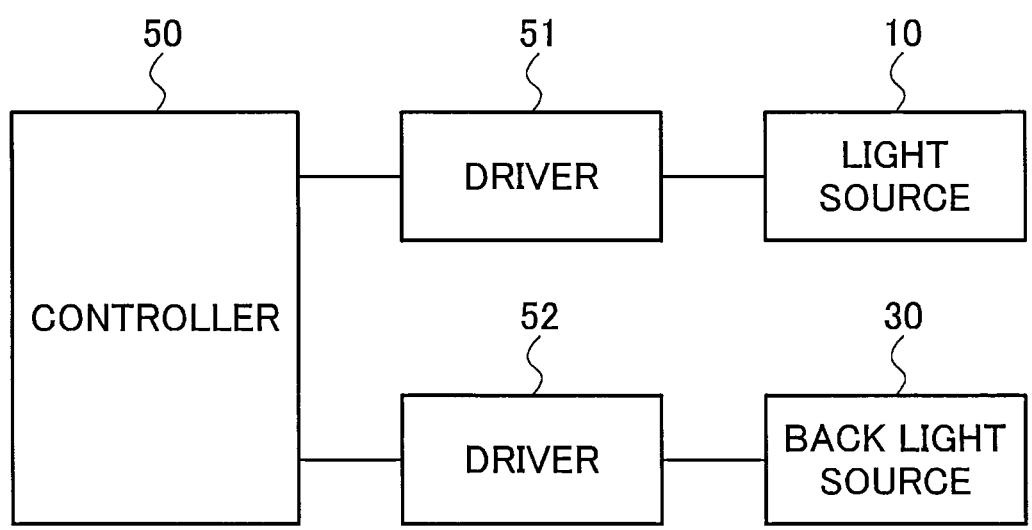
FIG. 12 is a block diagram schematically illustrating a configuration of a control system of the lighting device according to the second embodiment.

FIG. 12 is a block diagram schematically illustrating a configuration of a control system of the lighting device 110 according to the second embodiment. As illustrated in FIG. 12, the lighting device 110 includes the light source 10, a driver 51 that is a drive circuit that drives the light source 10, the back light source 30, a driver 52 that is a drive circuit that drives the back light source 30, and a controller 50 that controls the drivers 51 and 52. The controller 50 may be formed by a dedicated processing circuit. Also, the controller 50 may be implemented by a memory that stores a program, and a processor that is a processing device that executes the program.

Light Lb emitted from the back light source 30 travels toward the back plate 40, passes through the fine holes 41 of the back plate 40, and enters the diffuser 20 through the back surface 24 of the diffuser 20. Light Lb entering through the back surface 24 of the diffuser 20 exits through the front surface 23 of the diffuser 20. At this time, the controller 50 controls outputs of light emitting elements 13 of respective colors provided in the light source 10 so that the chromaticity in the central portion of the light emission surfaces (in particular the front surface 23) of the diffuser 20 is close to the chromaticity of an after-dark sky. When seeing light passing through the fine holes 41 provided in the back plate 40 through the diffuser 20 that is emitting light having such a color temperature, an observer can feel as if seeing stars. Also, when the back light source 30 includes LED elements having multiple color temperatures, it is possible to simulate the variation in color between stars that is seen in an actual starry sky. Also, by blinking the back light source 30, it is possible to simulate the twinkling of stars seen in an actual starry sky, allowing an observer to feel it as a more natural sky.

EXAMPLES

Example 1

An example of the diffuser 20 according to the first embodiment will be described below by using specific numerical values. A diffuser 20 according to Example 1 is a diffuser that has a plate shape having square main surfaces with sides having a length of 600 mm (thus the length $Z_d$ being 600 mm) and has a thickness $Y_d$ of 5 mm. Also, the refractive index of the base material (base material 27) of the diffuser 20 is 1.49, the refractive index of the particles is 1.43, and the particle size is 100 nm.

The diffuser 20 according to Example 1 has a one-side incidence configuration in which the light incident surface 21 is provided at only an edge portion (one side surface) forming one side of a square main surface of the diffuser 20.

Figure 13A:
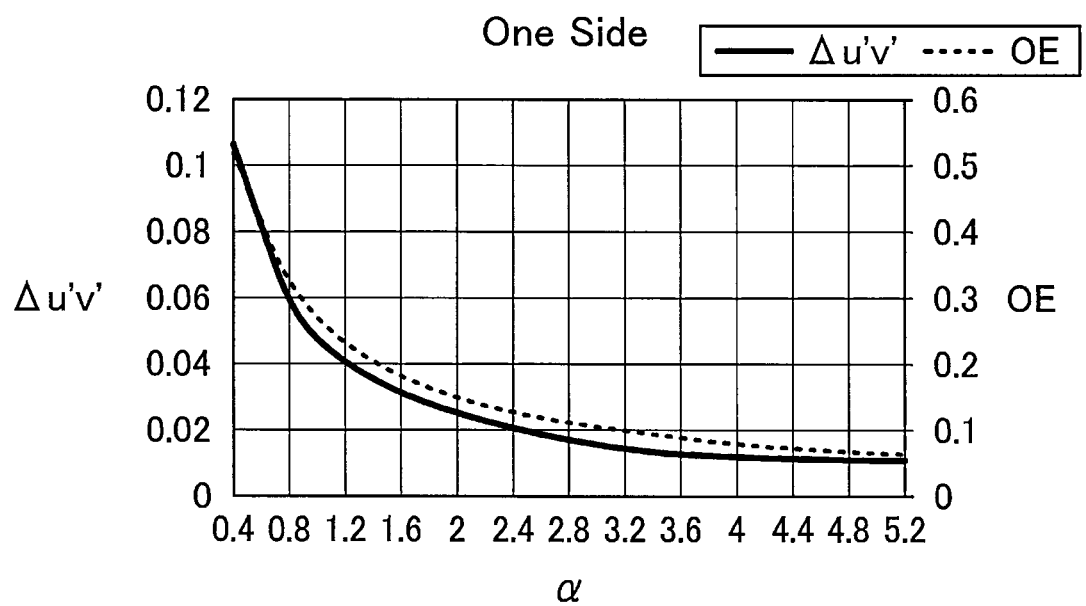
FIGS. 13A and 13B are graphs illustrating relationships between a and a light use efficiency, a color variation, or an illuminance variation of a diffuser according to Example 1.
Figure 13B:
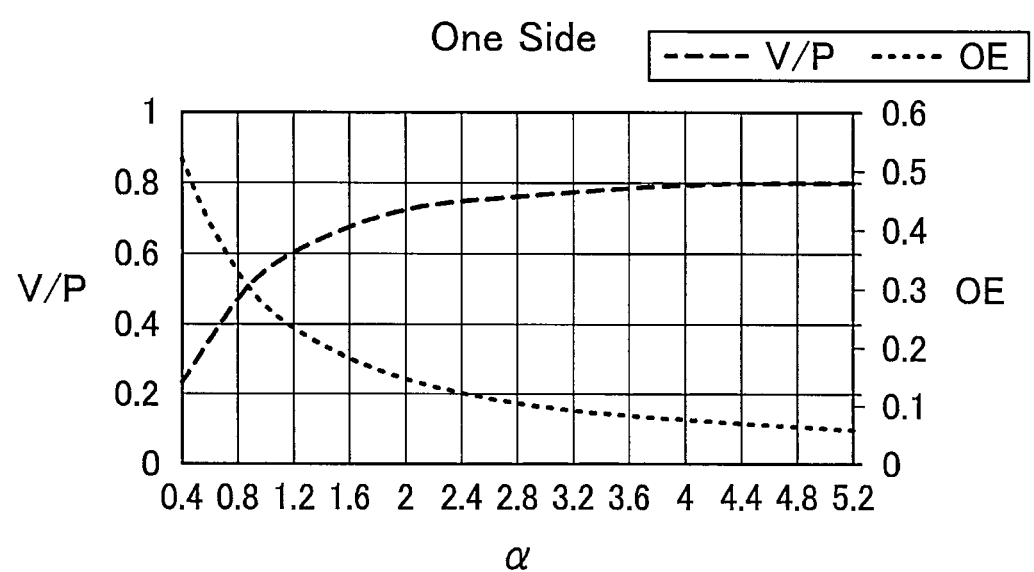

FIGS. 13A and 13B illustrate simulation results of a light use efficiency OE, a color variation $\Delta u'v'$, and an illuminance variation V/P when light from a white light source as the light source 10 having a correlated color temperature of 6500 K is incident on one edge portion (the light incident surface 21) of the diffuser 20. FIGS. 13A and 13B are graphs illustrating a relationship between a and the light use efficiency, color variation, or illuminance variation of the diffuser 20 according to Example 1. FIG. 13A is a graph illustrating the changes in the color variation and light use efficiency with respect to the change in $\alpha$. FIG. 13B is a graph illustrating the changes in the illuminance variation and light use efficiency with respect to the change in $\alpha$. In the simulation, the calculations were made by changing the condition of $\alpha$ (i.e., the condition of the particle concentration).

Here, the light use efficiency OE is the ratio of the luminous flux (lm) of the scattered light Ls emitted through the light emission surfaces (in this example, the front surface 23 and back surface 24) to the luminous flux (lm) of the incident light Li. Also, the color variation $\Delta u'v'$ is the largest of the differences between the chromaticity (center chromaticity) at a center position of the light emission surfaces and the chromaticities at other positions. Also, the illuminance variation V/P is the ratio of the minimum to the maximum of the illuminance in the light emission surfaces. The light use efficiency OE, color variation $\Delta u'v'$, and illuminance variation V/P were calculated on the assumption that the scattered light Ls emitted through the back surface 24 is folded and used, and the amount of the whole scattered light Ls is twice the amount of scattered light Ls emitted through the front surface 23.

As shown in FIGS. 13A and 13B, for example, in the lighting device 100 having a configuration in which light is incident on one side of the diffuser 20 of this example, by adjusting the particle concentration so that formula (3) is satisfied in the range of $0.4 \leq \alpha \leq 5$, the color variation $\Delta u'v'$ can be made not more than 0.10, the light use efficiency OE can be made not less than 0.06 (not less than 6%), and the illuminance variation V/P can be made not less than 0.23 (not less than 23%).

Also, for example, when the light use efficiency is considered to be important, by adjusting the particle concentration so that formula (3) is satisfied under $0.4 \leq \alpha \leq 3.15$, the light use efficiency OE can be made not less than 0.1. Further, when $\alpha \leq 1.47$, the light use efficiency OE can be made not less than 0.2; and when $\alpha \leq 0.085$, the light use efficiency OE can be made not less than 0.3.

Also, for example, when the color variation or illuminance variation is considered to be important, by adjusting the particle concentration so that formula (3) is satisfied under $1.23 \leq \alpha \leq 5$, the color variation $\Delta u'v'$ can be made not more than 0.04. Also, the illuminance variation V/P can be made not less than 0.55. Further, when $1.6 \leq \alpha$, the color variation $\Delta u'v'$ can be made not more than 0.02, and the illuminance variation V/P can be made not less than 0.67.

Moreover, for example, when the balance of the light use efficiency, color variation, and illuminance variation is considered to be important, by adjusting the particle concentration so that formula (3) is satisfied in the range of $1.23 \leq \alpha \leq 1.47$, the light use efficiency OE can be made not less than 0.2, the color variation can be made not more than 0.04, and the illuminance variation ratio V/P can be made not less than 0.67.

Example 2

A diffuser 20 according to Example 2 has the same shape as and is formed by the same materials as the diffuser 20 according to Example 1, but differs in having a both-side incidence configuration in which the light incident surface 21 is provided at edge portions (opposite two side surfaces) forming opposite two sides of a square main surface of the diffuser 20.

Figure 14A:
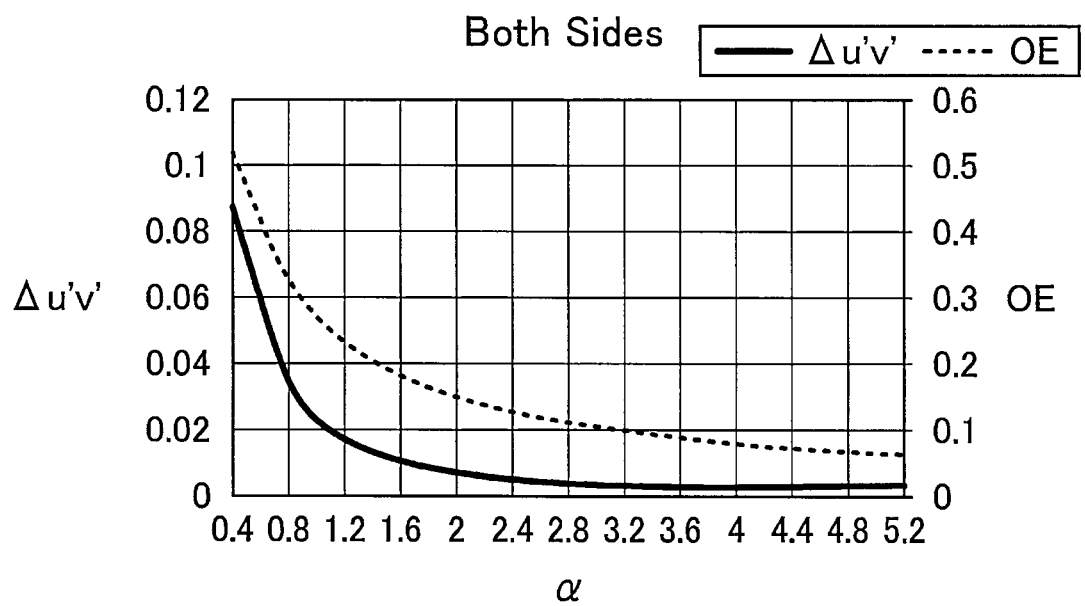
FIGS. 14A and 14B are graphs illustrating relationships between α and a light use efficiency, a color variation, or an illuminance variation of a diffuser according to Example 2.
Figure 14B:
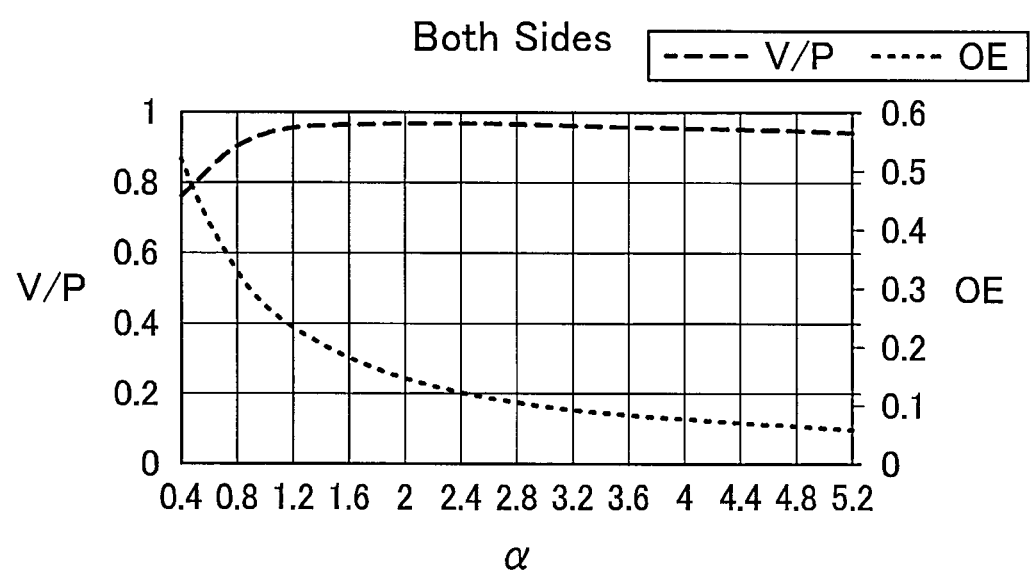

FIGS. 14A and 14B illustrate simulation results of the light use efficiency OE, color variation $\Delta u'v'$, and illuminance variation V/P when light from a white light source as the light source 10 having a correlated color temperature of 6500 K is incident on the opposite two edge portions (the light incident surfaces 21) of the diffuser 20. FIGS. 14A and 14B are graphs illustrating a relationship between a and the light use efficiency, color variation, or illuminance variation of the diffuser 20 according to Example 2. FIG. 14A is a graph illustrating the changes in the color variation and light use efficiency with respect to the change in $\alpha$. FIG. 14B is a graph illustrating the changes in the illuminance variation and light use efficiency with respect to the change in $\alpha$. In the simulation, the calculations were made by changing the condition of $\alpha$ (i.e., the condition of the particle concentration).

As shown in FIGS. 14A and 14B, for example, in the lighting device 100 having a configuration in which light is incident on both sides of the diffuser 20 of this example, by adjusting the particle concentration so that formula (3) is satisfied in the range of $0.4 \leq \alpha \leq 5$, the color variation $\Delta u'v'$ can be made not more than 0.09, the light use efficiency OE can be made not less than 0.06 (not less than 6%), and the illuminance variation V/P can be made not less than 0.77 (not less than 70%).

Also, for example, when the light use efficiency is considered to be important, by adjusting the particle concentration so that formula (3) is satisfied under $0.4 \leq \alpha \leq 3.2$, the light use efficiency OE can be made not less than 0.1. Further, when $\alpha \leq 1.47$, the light use efficiency OE can be made not less than 0.2; and when $\alpha \leq 0.085$, the light use efficiency OE can be made not less than 0.3.

Also, for example, when the color variation or illuminance variation is considered to be important, by adjusting the particle concentration so that formula (3) is satisfied under $0.72 \leq \alpha \leq 5$, the color variation $\Delta u'v'$ can be made not more than 0.04. Also, the illuminance variation V/P can be made not less than 0.90. Further, when $1.2 \leq \alpha$, the color variation $\Delta u'v'$ can be made not more than 0.02, and the illuminance variation V/P can be made not less than 0.95.

Moreover, for example, when the balance of the light use efficiency, color variation, and illuminance variation is considered to be important, by adjusting the particle concentration so that formula (3) is satisfied in the range of $0.72 \leq \alpha \leq 1.47$, the light use efficiency OE can be made not less than 0.2, the color variation can be made not more than 0.04, and the illuminance variation ratio V/P can be made not less than 0.90.

<<3>> Third Embodiment

Figure 15:
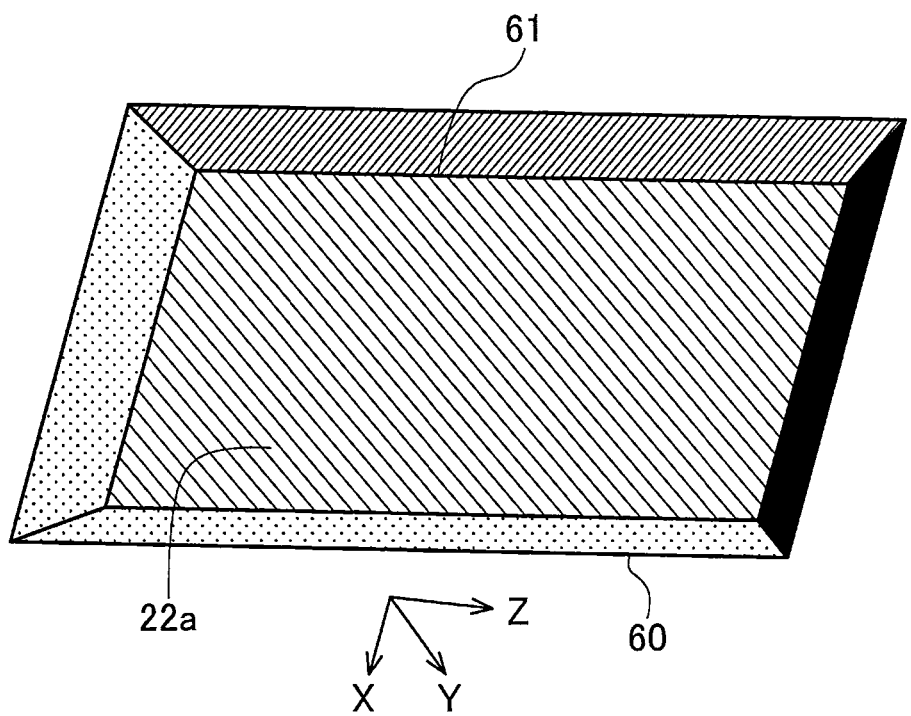
FIG. 15 is a perspective view schematically illustrating a configuration of a lighting device according to a third embodiment.
Figure 16:
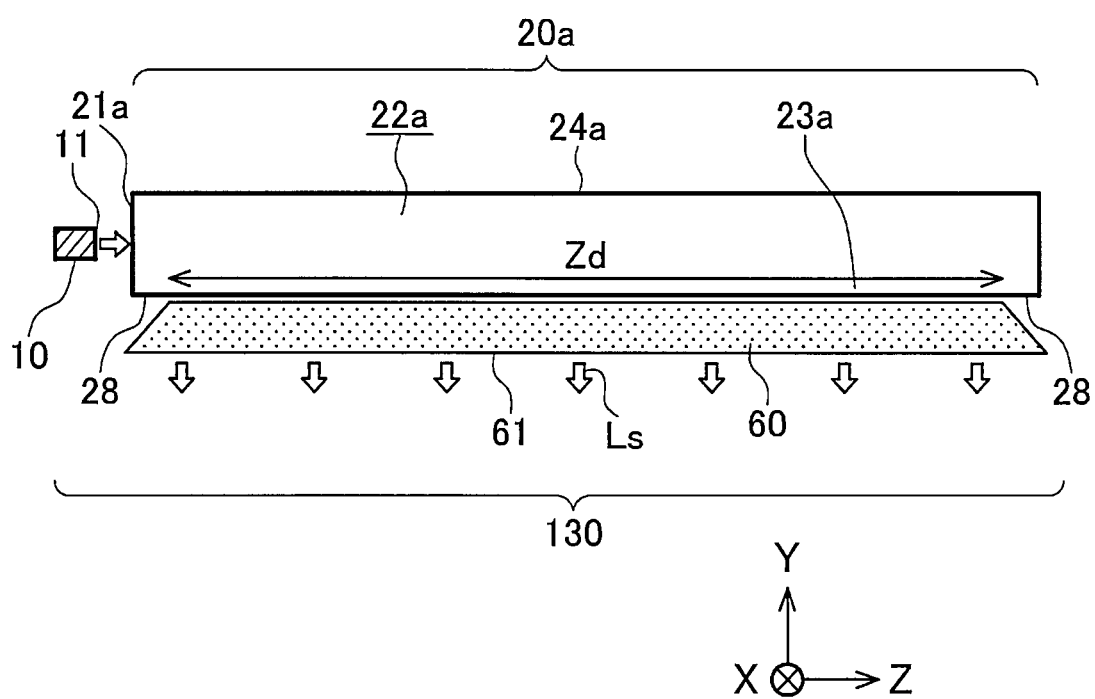
FIG. 16 is a cross-sectional view schematically illustrating the configuration of the lighting device according to the third embodiment.

FIG. 15 is a perspective view schematically illustrating a configuration of a lighting device 130 according to a third embodiment. FIG. 16 is a cross-sectional view schematically illustrating the configuration of the lighting device 130. The third embodiment describes an example in which a diffuser 20a has, therein (i.e., in a light guiding and diffusing portion 22a), a distribution of the concentration (i.e., the number N (particles/mm³) of particles per unit volume) of nanoparticles 26.

As illustrated in FIGS. 15 and 16, the lighting device 130 includes a light source 10, the diffuser 20a, and a frame 60 having an opening 61. The lighting device 130 employs an edge incidence system in which the light source 10 is disposed to face a light incident surface (first edge portion 21a) that is a side surface located at an edge portion of the diffuser 20a. The diffuser 20a includes the first edge portion 21a, which is the light incident surface, the light guiding and diffusing portion 22a, and diffused light emission surfaces 23a and 24a as first light emission surfaces. The frame 60 is disposed so that the opening 61 faces the diffused light emission surface 23a. For example, an outer shape of the frame 60 is rectangular, and the opening 61 is also rectangular. However, the shapes of the frame 60 and opening 61 are not limited to those illustrated in FIG. 15 or 16.

Light emitted from a light emitting surface 11 of the light source 10 is incident on the first edge portion 21a, which is the light incident surface. The light guiding and diffusing portion 22a includes a base material as a medium, and the multiple nanoparticles 26 (e.g., illustrated in FIG. 5) present in the base material. The light guiding and diffusing portion 22a generates scattered light Ls by guiding incident light and scattering it with the nanoparticles 26. Scattered light Ls is emitted through the opening 61.

The diffuser 20a may include at least one region 28 in which the concentration of the nanoparticles 26 is low, near at least one side surface. As illustrated in FIG. 15 or 16, when the area of the diffused light emission surface 23a, which is a front surface of the light guiding and diffusing portion 22a, is larger than the area of the opening 61 of the frame 60 provided in the lighting device 130, by setting the region 28, which cannot be seen through the opening 61, to be a region in which the concentration of the nanoparticles 26 is low, it is possible to reduce light emission by the region 28 and improve the light use efficiency of the entire lighting device 130. Specifically, by setting the concentration of the nanoparticles 26 in the region 28 of the light guiding and diffusing portion 22a that cannot be seen through the opening 61 to be the concentration of the nanoparticles 26 in a region of the light guiding and diffusing portion 22a that can be seen through the opening 61, the scattered light Ls emitted through the opening 61 from the diffused light emission surface 23a can be increased, and thus the light use efficiency is improved.

Also, the region 28 may be at least one region that includes no nanoparticles 26 and is provided near at least one side surface of the light guiding and diffusing portion 22a. For example, in the example of FIGS. 15 and 16, it is possible to provide at least one region 28 including no nanoparticles 26 in at least one portion of the light guiding and diffusing portion 22a that is not seen through the opening 61. Even in this case, it is possible to reduce light emission at the region 28, and improve the light use efficiency of the entire lighting device 130.

Since the region 28 that cannot be seen through the opening 61 is not used for the purpose of emitting scattered light Ls simulating a blue sky, the length of the light guiding and diffusing portion 22a excluding the region 28 in the light guiding direction (Z direction) can be taken as $Z_d$ described above. Also, when the region 28 is a region including no nanoparticles 26, the first edge portion 21a, which is the light incident surface, need not necessarily be provided at an edge portion of the light guiding and diffusing portion 22a. Specifically, the diffuser 20a may have a configuration different from that illustrated in FIG. 16 as long as it has a configuration in which light is incident on the light guiding and diffusing portion 22a through the region 28 including no nanoparticles 26. It is more preferable that the region 28 including no nanoparticles 26 be provided at a side surface other than the first edge portion 21a at which the light incident surface is provided, in that the intensity and direction of the guided light can be accurately controlled.

Also, the above-described length $Z_d$ may be taken as a length of the light guiding and diffusing portion 22a excluding the region 28. For example, the length $Z_d$ of the light guiding and diffusing portion 22a in an optical axis direction of the light source 10 may be taken as a length of the light guiding and diffusing portion 22a excluding the region 28 in the optical axis direction.

<<4>> Fourth Embodiment

Figure 17:
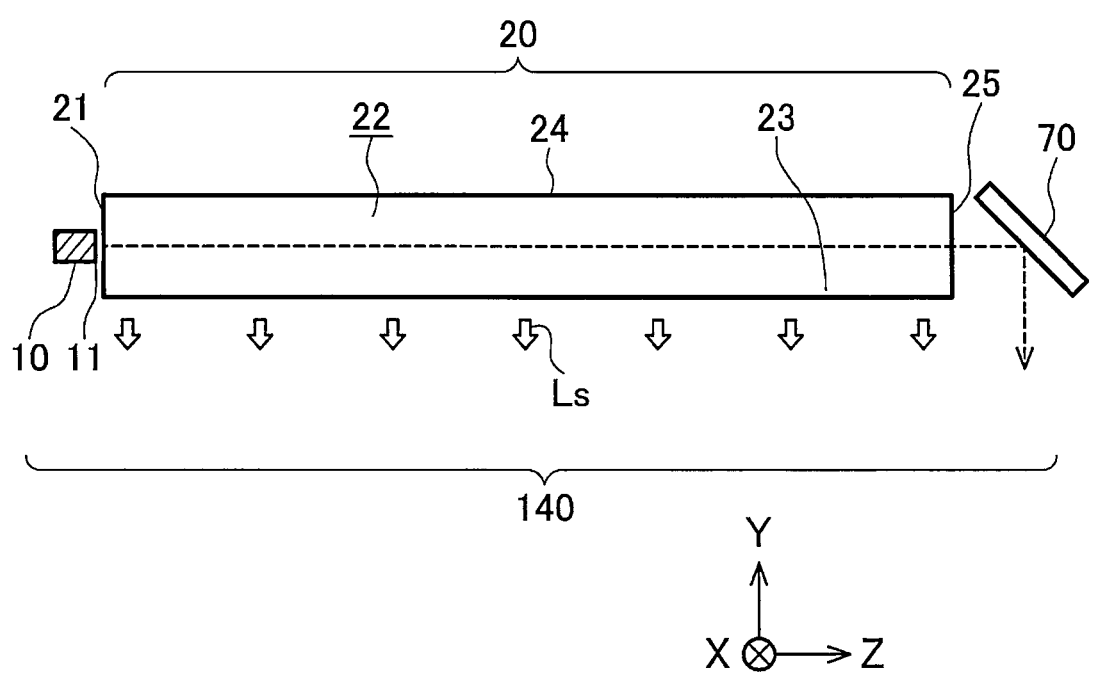
FIG. 17 is a cross-sectional view schematically illustrating a configuration of a lighting device according to a fourth embodiment.

FIG. 17 is a cross-sectional view schematically illustrating a configuration of a lighting device 140 according to a fourth embodiment. As illustrated in FIG. 17, the lighting device 140 includes a light source 10, a diffuser 20, and a light extractor 70. The diffuser 20 includes a light incident surface 21 as a light incident portion, a light guiding and diffusing portion 22, a front surface 23 and a back surface 24 that are diffused light emission surfaces (first light emission surfaces), and a second light emission surface 25 as a light emission portion.

Light emitted from a light emitting surface 11 of the light source 10 is incident on the light incident surface 21. The light guiding and diffusing portion 22 includes a base material as a medium, and multiple nanoparticles 26 (e.g., illustrated in FIG. 5) present in the base material. The light guiding and diffusing portion 22 guides incident light and scatters it with the nanoparticles 26, thereby generating scattered light Ls. The light guiding and diffusing portion 22 includes, at an edge portion thereof, the light incident surface 21, and includes, at a surface opposite the light incident surface 21, the second light emission surface 25. The light source 10 is disposed at an edge portion of the diffuser 20, and light emitted from the light emitting surface 11 of the light source 10 enters the light guiding and diffusing portion 22 through the light incident surface 21, is guided in the light guiding and diffusing portion 22, and is emitted through the second light emission surface 25. Or light emitted from the light emitting surface 11 of the light source 10 enters the light guiding and diffusing portion 22 through the light incident surface 21, is guided in the light guiding and diffusing portion 22, and is scattered by the nanoparticles 26 as light scattering particles included in the light guiding and diffusing portion 22, and part of the scattered light (i.e., diffused light) Ls is emitted through the front surface 23, which is a diffused light emission surface of the light guiding and diffusing portion 22. The correlated color temperature of the light emitted through the second light emission surface 25 is lower than the correlated color temperature of the light emitted through the front surface 23.

Here, at least part of the light emitted through the second light emission surface 25 is emitted in the same direction (in the example of FIG. 17, a direction that is perpendicular to the light guiding direction and toward the front surface 23 side) as the scattered light Ls, by the light extractor 70 provided near the second light emission surface 25. The light extractor 70 has, for example, a lens, a mirror, a film, a surface coating, or the like formed therein to control refraction, reflection, diffusion, transmission, or the like of the emitted light (i.e., the emitted light guided in the light guiding and diffusing portion 22 and emitted through the second light emission surface 25), and has a function of directing the emitted light emitted through the second light emission surface 25 in a particular direction. In the example of FIG. 17, the particular direction is a direction (−Y direction) perpendicular to the light guiding direction and toward the front surface 23 side, and is, for example, a direction toward a room.

In a specific example, the light emitted through the second light emission surface 25 is scattered light spreading in an angular direction, and in order to deflect the light in the particular direction to bring it toward a room, the light extractor 70 is a mirror, and a reflecting surface of the mirror has a curvature. With such a configuration, the light reflected by the light extractor 70 can be controlled to be substantially parallel light and travel in the particular direction toward the front surface 23 side.

Also, to provide a configuration that does not dazzle a person who is present on the front surface 23 side and looks at the light extractor 70, it is preferable to provide the light extractor 70 with a diffusing function, for example. In this case, it is possible to provide light diffused by the light extractor 70 to the front surface 23 side while reducing dazzling of a person.

In the present application, the scopes indicated by terms, such as "parallel" or "perpendicular", indicating the positions of parts, the positional relationships between parts, or the shapes of parts are scopes taking into account manufacturing tolerances, assembly variations, and the like. Thus, in the present application, when terms, such as "parallel" or "perpendicular", indicating the positions of parts, the positional relationships between parts, or the shapes of parts are used, the scopes indicated by these terms indicate scopes taking into account manufacturing tolerances, assembly variations, and the like.

REFERENCE SIGNS LIST 100, 110, 130, 140 lighting device, 10 light source, 11 light emitting surface, 12 substrate, 13 light emitting element, 20, 20a diffuser, 21 light incident surface, 21a first edge portion (side surface), 22 light guiding and diffusing portion, 23 front surface, 23a diffused light emission surface, 24 back surface, 25 second light emission surface, 26 nanoparticle, 27 base material, 30 back light source, 40 back plate, 41 fine hole, 60 frame, 70 light extractor, Li incident light, Lt guided light, Ls scattered light, $T_{ci}$, $T_{cs}$, $T_{ch}$, $T_{cl}$ correlated color temperature, N concentration of nanoparticles, A average particle radius of nanoparticles, $Q_S$ scattering efficiency, MFP mean free path, $Z_d$ length of diffuser, $Y_d$ thickness of diffuser.

The invention claimed is:

1. A diffuser comprising:
at least one light incident surface on which light emitted from a light source is incident as incident light;
a light guiding and diffusing portion including a medium and nanoparticles present in the medium, the light guiding and diffusing portion generating scattered light by guiding the incident light and scattering the incident light with the nanoparticles; and
a first light emission surface to emit the scattered light, wherein
a correlated color temperature of the scattered light is higher than a correlated color temperature of the incident light, and
the diffuser satisfies:

$$\text{MFP}=1/(\pi \times A^2 \times Q_s \times N)=\alpha Z_d,$$

$$0.4 \leq \alpha \leq 5$$

where N denotes a number (particles/mm3) of the nanoparticles included in a unit volume of the light guiding and diffusing portion, A denotes an average particle radius (mm) of the nanoparticles, $Q_s$ denotes a scattering efficiency determined by a combination of the nanoparticles and the medium of the light guiding and diffusing portion, R denotes a ratio of a circumference of a circle, MFP denotes a mean free path (mm) for light of a wavelength of 550 nm, Zd denotes a length (mm) of the light guiding and diffusing portion in a light guiding direction of the incident light, and α denotes a coefficient.

2. The diffuser of claim 1, wherein the light incident surface is formed at an edge portion of the light guiding and diffusing portion.

3. The diffuser of claim 1, wherein a percentage of a thickness $Y_d$ of the light guiding and diffusing portion relative to the length $Z_d$ is not less than 0.25% and not more than 20%, the thickness $Y_d$ being measured in a direction perpendicular to the length $Z_d$.

4. The diffuser of claim 1, wherein
the coefficient cc is not more than 3.2, and
a light use efficiency represented by a ratio of a luminous flux of the scattered light to a luminous flux of the incident light emitted from the light source is not less than 10%.

5. The diffuser of claim 1, wherein
the coefficient α is not less than 0.72, and
a color variation represented by a largest of differences between a chromaticity at a center position of the first light emission surface and chromaticities at other positions of the first light emission surface is not more than 0,04.

6. The diffuser of claim 1, wherein the coefficient α satisfies
$1.23 \leq \alpha \leq 1.47$ when the light incident surface is provided at only one of two edge portions of the light guiding and diffusing portion located opposite each other, and
$0.72 \leq \beta \leq 1.47$ when the light incident surface is provided at both of the two edge portions of the light guiding and diffusing portion located opposite each other.

7. The diffuser of claim 1, wherein
the light incident surface is a surface across the light guiding direction, and
the first light emission surface is a surface across the light incident surface.

8. A lighting device comprising:
a light source; and
the diffuser of claim 1.

9. The diffuser of claim 1, wherein
the length is in a range of 50 mm to 2000 mm, and
a light use efficiency represented by a ratio of a luminous flux of the scattered light to a luminous flux of the incident light emitted from the light source is not less than 10%, or a color variation represented by a largest of differences between a chromaticity at a center position of the first light emission surface and chromaticities at other positions of the first light emission surface is not more than 0.04.

10. The diffuser of claim 1, wherein the diffuser is used in a sting device to simulate a blue sky.

11. The lighting device of claim 8, wherein
the lighting device simulates a blue sky,
the diffuser includes a first edge portion and a second edge portion of the light guiding and diffusing portion located opposite each other,
the light incident surface includes a first light incident surface formed at the first edge portion and a second light incident surface formed at the second edge portion,
the light source includes a first light source portion facing the first light incident surface and a second light source portion facing the second light incident surface, and
a color variation represented by a largest of differences between a chromaticity at a center position of the first light emission surface and chromaticities at other positions of the first light emission surface is not more than 0.04.

12. The lighting device of claim 8, wherein
the light source includes a plurality of light emitting elements to emit light of a plurality of different respective colors, and
the light source is configured so that when a chromaticity in a central portion of the first light emission surface of scattered light generated when the light emitting element of each color of the plurality of light emitting elements is turned on alone is plotted on a CIE 1931 chromaticity diagram and the plotted points are connected by one or more straight lines, a target chromaticity is included in a region enclosed by the straight lines or located on the straight lines.

13. The lighting device of claim 8, wherein the light source includes a light emitting element to emit white light, a light emitting element to emit blue light, and a light emitting element to emit green light.

14. The lighting device of claim 8, wherein the light source includes a light emitting element to emit white light, a light emitting element to emit blue light, a light emitting element to emit green light, and a light emitting element to emit orange light.

15. The lighting device of claim 8, further comprising:
a back light source disposed to face a back surface that is a surface of the diffuser opposite the first light emission surface; and
a back plate disposed between the back light source and the diffuser,
wherein the back plate has a light transmission characteristic that allows at least part of light emitted from the back light source to transmit through the back plate and be incident on the back surface of the diffuser.

16. The lighting device of claim 8, further comprising:
a frame having an opening disposed to face the first light emission surface, and
a concentration of the nanoparticles in a region of the light guiding and diffusing portion that cannot be seen through the opening is lower than a concentration of the nanoparticles in a region of the light guiding and diffusing portion that can be seen through the opening.

17. The lighting device of claim 8, wherein
the light guiding and diffusing portion further includes a second light emission surface disposed to face the light incident surface, the second light emission surface emitting light guided in the light guiding and diffusing portion, and
the lighting device further comprises a light extractor to deflect the light emitted through the second light emission surface of the light guiding and diffusing portion, toward a first light emission surface side.

18. The lighting device of claim 12, wherein when the target chromaticity is represented by a point $(x_p, y_p)$ on the CIF 1931 chromaticity diagram, $$(x_p, y_p) = (0.25 \pm 0.03, 0.27 \pm 0.03).$$

19. The lighting device of claim 12, wherein when the target chromaticity is represented by a point $(x_p, y_p)$ on the CIE 1931 chromaticity diagram, $$(x_p, y_p) = (0.23 \pm 0.03, 0.23 \pm 0.03).$$

20. The lighting device of claim 15, wherein the back plate includes a light reflector to reflect scattered light emitted through the back surface or a light absorber to absorb scattered light emitted through the back surface.

* * * * *